United States Patent
Efthivoulidis et al.

(10) Patent No.: US 12,212,649 B2
(45) Date of Patent: Jan. 28, 2025

(54) TRIGGER SIGNALING THROUGH A CLOCK SIGNAL IN CASCADING RADAR SYSTEMS

(71) Applicant: Infineon Technologies AG, Neubiberg (DE)

(72) Inventors: George Efthivoulidis, Graz (AT); Tony Gschier, Graz (AT); Bernd Zimek, Graz (AT); Peter Thurner, Weissensee (AT); Thomas Santa, Seeboden (AT)

(73) Assignee: Infineon Technologies AG, Neubiberg (DE)

( * ) Notice: Subject to any disclaimer, the term of this patent is extended or adjusted under 35 U.S.C. 154(b) by 125 days.

(21) Appl. No.: 18/188,629

(22) Filed: Mar. 23, 2023

(65) Prior Publication Data
US 2024/0322993 A1    Sep. 26, 2024

(51) Int. Cl.
*H04L 7/00* (2006.01)
*H04L 7/033* (2006.01)

(52) U.S. Cl.
CPC .......... *H04L 7/0083* (2013.01); *H04L 7/0087* (2013.01); *H04L 7/0331* (2013.01)

(58) Field of Classification Search
CPC .... H04L 7/0083; H04L 7/0087; H04L 7/0331
USPC ....................................................... 375/376
See application file for complete search history.

(56) References Cited

U.S. PATENT DOCUMENTS

| | | | | |
|---|---|---|---|---|
| 3,668,691 | A * | 6/1972 | Sergo, Jr. ............... | H03M 1/58 341/169 |
| 2019/0107427 | A1* | 4/2019 | Waelde .................. | G01S 13/88 |
| 2019/0386810 | A1 | 12/2019 | Barrilado Gonzalez et al. | |
| 2024/0248191 | A1* | 7/2024 | Schmalzl ............... | G01S 7/003 |

* cited by examiner

Primary Examiner — Leila Malek
(74) Attorney, Agent, or Firm — Harrity & Harrity, LLP

(57) ABSTRACT

A radar monolithic microwave integrated circuit (MMIC) includes a trigger encoder configured to receive a clock signal comprising a plurality of clock pulses having a fixed amplitude and a trigger signal configured to indicate trigger events. The trigger encoder is configured to encode the trigger signal into the clock signal to generate a distributed clock signal by skipping at least one clock pulse of the plurality of clock pulses to indicate a trigger event. The radar MMIC is configured to output the distributed clock signal having the at least one clock pulse skipped to indicate the trigger event. The radar MMIC is configured to receive the distributed clock signal as a received distributed clock signal. The radar MMIC further includes a radar operation controller configured to detect the trigger event based on the received distributed clock signal and initiate a radar operation based on detecting the trigger event.

21 Claims, 15 Drawing Sheets

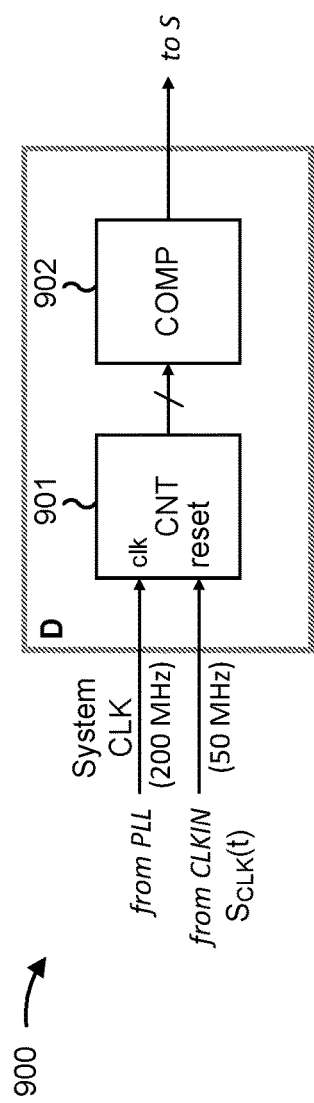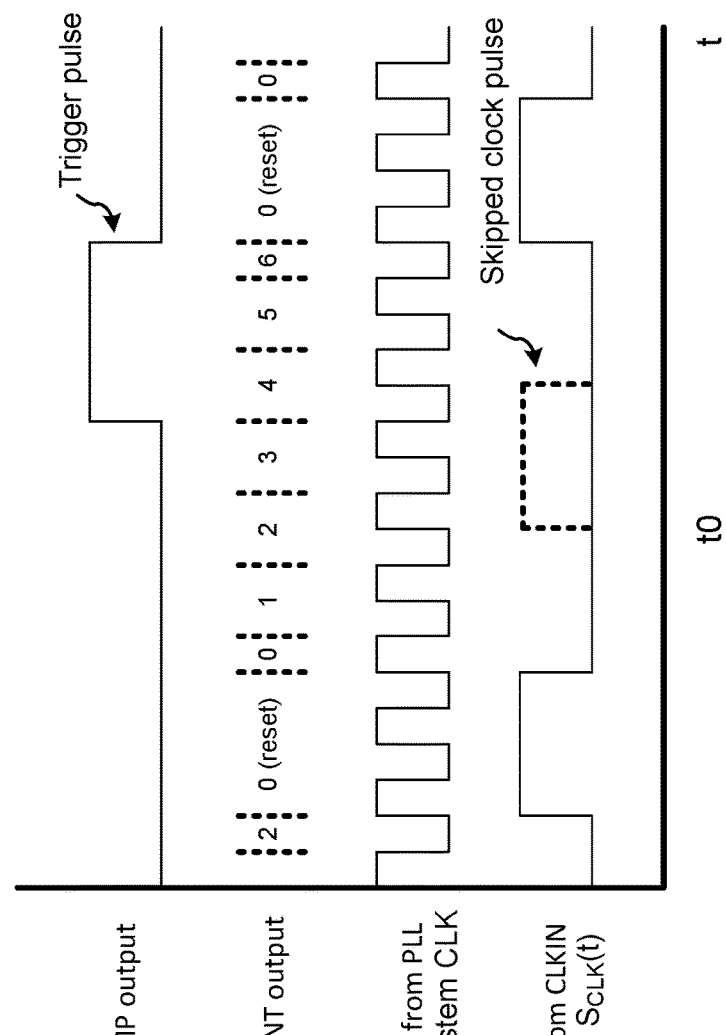

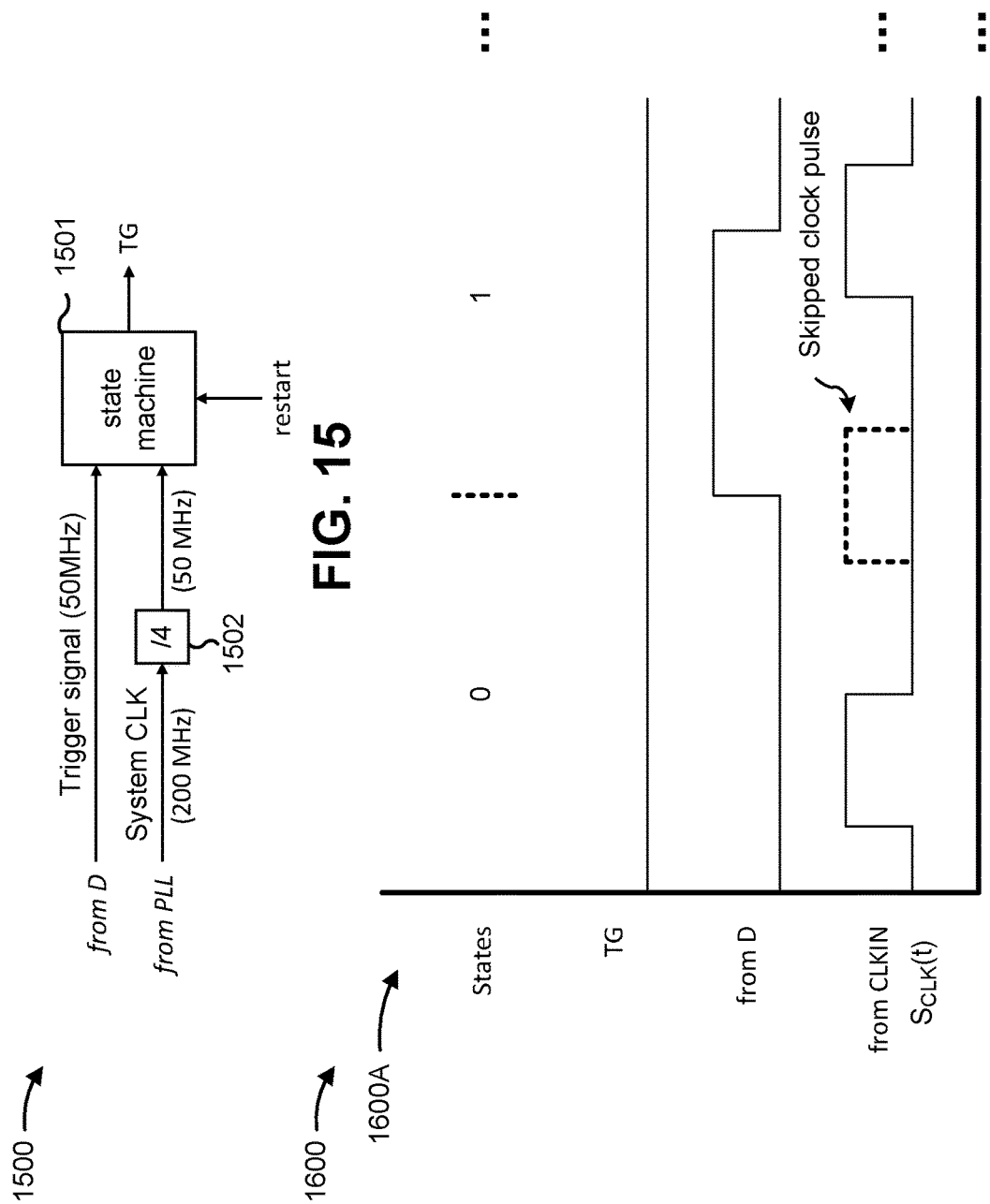

TRIGGER SIGNALING THROUGH A CLOCK SIGNAL IN CASCADING RADAR SYSTEMS

BACKGROUND

Radar sensors are used in a number of applications to detect objects, where the detection typically comprises measuring distances, velocities, or angles of arrival associated with detected targets. In particular, in the automotive sector, there is an increasing need for radar sensors that are able to be used in, for example, driving assistance systems (e.g., advanced driver assistance systems (ADAS)), such as, for example, in adaptive cruise control (ACC) or radar cruise control systems. Such systems are able to automatically adjust a speed of a motor vehicle in order to maintain a safe distance from other motor vehicles traveling in front of the motor vehicle (and from other objects and pedestrians). Other example applications of a radar sensor in the automotive sector include blind spot detection, lane change assist, and the like.

SUMMARY

In some implementations, a cascaded radar monolithic microwave integrated circuit (MMIC) system includes a first radar MMIC comprising a trigger encoder configured to receive a clock signal comprising a plurality of clock pulses having a fixed amplitude and a trigger signal configured to indicate trigger events, wherein the trigger encoder is configured to encode the trigger signal into the clock signal to generate a distributed clock signal by skipping at least one clock pulse of the plurality of clock pulses to indicate a trigger event, wherein the first radar MMIC is configured to output the distributed clock signal having the at least one clock pulse skipped to indicate the trigger event; a second radar MMIC configured to receive the distributed clock signal and derive a system clock signal from the distributed clock signal, wherein the second radar MMIC comprises: a trigger decoder configured to detect an absence of the at least one clock pulse in the distributed clock signal and generate the trigger signal comprising a trigger pulse that indicates the trigger event in response to detecting the absence of the at least one clock pulse in the distributed clock signal; and a radar operation controller configured to receive the trigger signal and initiate a radar operation based on detecting the trigger pulse.

In some implementations, a cascaded radar MMIC system includes a first radar MMIC comprising a trigger encoder configured to receive a clock signal comprising a plurality of clock pulses having a fixed duty cycle and a trigger signal configured to indicate trigger events, wherein the trigger encoder is configured to encode the trigger signal into the clock signal to generate a distributed clock signal by modifying a duty cycle of at least one clock pulse of the plurality of clock pulses to generate at least one encoded clock pulse that indicates a trigger event, wherein the duty cycle of the at least one encoded clock pulse is different from the fixed duty cycle, wherein the first radar MMIC is configured to output the distributed clock signal having the at least one encoded clock pulse to indicate the trigger event; a second radar MMIC configured to receive the distributed clock signal and derive a system clock signal from the distributed clock signal, wherein the second radar MMIC comprises: a trigger decoder configured to detect the at least one encoded clock pulse in the distributed clock signal and generate the trigger signal comprising a trigger pulse that indicates the trigger event in response to detecting the at least one encoded clock pulse in the distributed clock signal; and a radar operation controller configured to receive the trigger signal and initiate a radar operation based on detecting the trigger pulse.

In some implementations, a method of synchronizing a cascaded radar MMIC system includes encoding, by a first radar MMIC, a trigger signal into a clock signal comprising a plurality of clock pulses having a fixed amplitude to generate a distributed clock signal by skipping at least one clock pulse of the plurality of clock pulses to indicate a trigger event, wherein the trigger signal is configured to indicate trigger events; outputting, by the first radar MMIC, the distributed clock signal having the at least one clock pulse skipped to indicate the trigger event; receiving, by a second radar MMIC, the distributed clock signal; deriving, by the second radar MMIC, a system clock signal from the distributed clock signal; demodulating, by the second radar MMIC, the distributed clock signal to detect an absence of the at least one clock pulse in the distributed clock signal; generating, by the second radar MMIC, the trigger signal comprising a trigger pulse that indicates the trigger event in response to detecting the absence of the at least one clock pulse in the distributed clock signal; and initiating, by the second radar MMIC, a radar operation based on detecting the trigger pulse in the trigger signal.

In some implementations, a radar MMIC includes a local oscillator configured to generate a local oscillator signal; a trigger encoder configured to receive a clock signal comprising a plurality of clock pulses having a fixed amplitude and a trigger signal configured to indicate trigger events; wherein the trigger encoder is configured to encode the trigger signal into the clock signal to generate a distributed clock signal by skipping at least one clock pulse of the plurality of clock pulses to indicate a trigger event, wherein the radar MMIC is configured to output the distributed clock signal having the at least one clock pulse skipped to indicate the trigger event, wherein the radar MMIC is configured to receive the distributed clock signal as a received distributed clock signal, and wherein the radar MMIC is configured to output the local oscillator signal; and a radar operation controller configured to detect the trigger event based on the received distributed clock signal and initiate a radar operation based on detecting the trigger event.

In some implementations, a radar MMIC includes at least one or a transmit channel for transmitting radio frequency (RF) signals or a receive channel for receiving RF echoes; a clock input circuit configured to receive a distributed clock signal and derive a system clock signal from the distributed clock signal, wherein the distributed clock signal is a clock signal comprising a plurality of clock pulses having a fixed amplitude that is encoded with a trigger signal configured to indicate trigger events, wherein at least one clock pulse of the plurality of clock pulses is skipped in the distributed clock signal to indicate a trigger event; a trigger decoder configured to detect an absence of the at least one clock pulse in the distributed clock signal and generate the trigger signal comprising a trigger pulse that indicates the trigger event in response to detecting the absence of the at least one clock pulse in the distributed clock signal; and a radar operation controller configured to receive the trigger signal and initiate a radar operation based on detecting the trigger pulse.

BRIEF DESCRIPTION OF THE DRAWINGS

Implementations are described herein making reference to the appended drawings.

FIG. 9 shows a schematic block diagram of a trigger decoder according to one or more implementations.

FIG. 10 is a waveform diagram of various signals corresponding to the trigger decoder described in connection with FIG. 9.

FIG. 15 shows a schematic block diagram of a state machine system according to one or more implementations.

FIGS. 16A-16C show a waveform diagram of various signals corresponding to the state machine system described in connection with FIG. 15.

DETAILED DESCRIPTION

Figure 1:
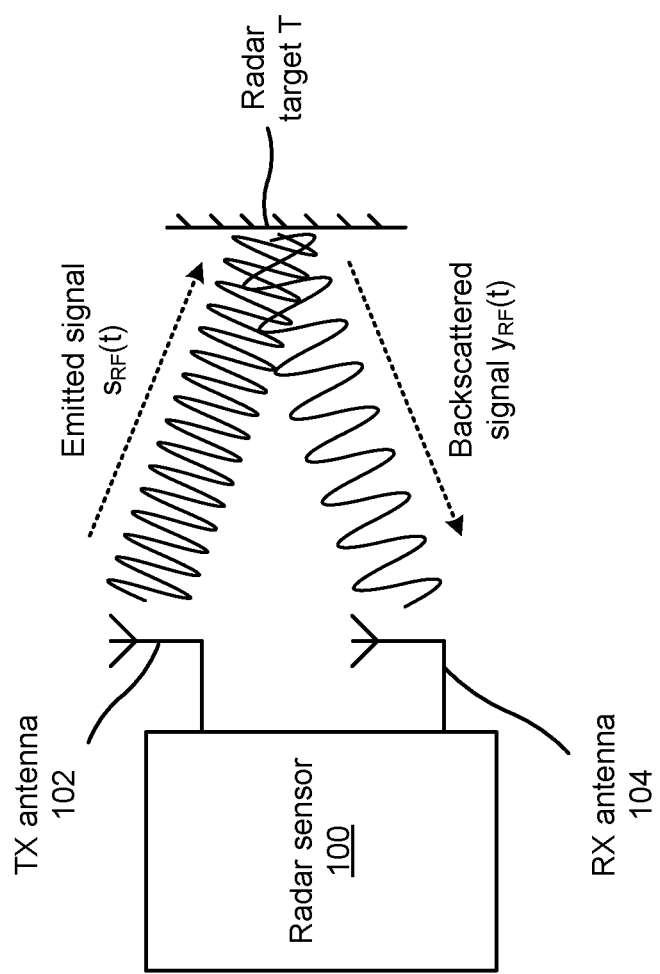
FIG. 1 is a diagram of an example application of a frequency-modulated continuous-wave (FMCW) radar sensor.

In the following, details are set forth to provide a more thorough explanation of example implementations. However, it will be apparent to those skilled in the art that these implementations may be practiced without these specific details. In other instances, well-known structures and devices are shown in block diagram form or in a schematic view rather than in detail in order to avoid obscuring the implementations. In addition, features of the different implementations described hereinafter may be combined with each other, unless specifically noted otherwise.

Further, equivalent or like elements or elements with equivalent or like functionality are denoted in the following description with equivalent or like reference numerals. As the same or functionally equivalent elements are given the same reference numbers in the figures, a repeated description for elements provided with the same reference numbers may be omitted. Hence, descriptions provided for elements having the same or like reference numbers are mutually exchangeable.

The orientations of the various elements in the figures are shown as examples, and the illustrated examples may be rotated relative to the depicted orientations. The descriptions provided herein, and the claims that follow, pertain to any structures that have the described relationships between various features, regardless of whether the structures are in the particular orientation of the drawings, or are rotated relative to such orientation. Similarly, spatially relative terms, such as "top," "bottom," "below," "beneath," "lower," "above," "upper," "middle," "left," and "right," are used herein for ease of description to describe one element's relationship to one or more other elements as illustrated in the figures. The spatially relative terms are intended to encompass different orientations of the element, structure, and/or assembly in use or operation in addition to the orientations depicted in the figures. A structure and/or assembly may be otherwise oriented (rotated 90 degrees or at other orientations), and the spatially relative descriptors used herein may be interpreted accordingly. Furthermore, the cross-sectional views in the figures only show features within the planes of the cross-sections, and do not show materials behind the planes of the cross-sections, unless indicated otherwise, in order to simplify the drawings.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In implementations described herein or shown in the drawings, any direct electrical connection or coupling, e.g., any connection or coupling without additional intervening elements, may also be implemented by an indirect connection or coupling, e.g., a connection or coupling with one or more additional intervening elements, or vice versa, as long as the general purpose of the connection or coupling, for example, to transmit a certain kind of signal or to transmit a certain kind of information, is essentially maintained. Features from different implementations may be combined to form further implementations. For example, variations or modifications described with respect to one of the implementations may also be applicable to other implementations unless noted to the contrary.

As used herein, the terms "substantially" and "approximately" mean "within reasonable tolerances of manufacturing and measurement." For example, the terms "substantially" and "approximately" may be used herein to account for small manufacturing tolerances or other factors (e.g., within 5%) that are deemed acceptable in the industry without departing from the aspects of the implementations described herein. For example, a resistor with an approximate resistance value may practically have a resistance within 5% of the approximate resistance value. As another example, an approximate signal value may practically have a signal value within 5% of the approximate signal value.

In the present disclosure, expressions including ordinal numbers, such as "first", "second", and/or the like, may modify various elements. However, such elements are not limited by the above expressions. For example, the above expressions do not limit the sequence and/or importance of the elements. The above expressions are used merely for the purpose of distinguishing an element from the other elements. For example, a first box and a second box indicate different boxes, although both are boxes. For further example, a first element could be termed a second element, and similarly, a second element could also be termed a first element without departing from the scope of the present disclosure.

A radar monolithic microwave integrated circuit (MMIC), sometimes referred to as single radar chip, may incorporate all core functions of a radio frequency (RF) frontend of a radar transceiver (e.g., local oscillator, power amplifiers, low-noise amplifiers (LNAs), mixers, etc.), analog preprocessing of the intermediate frequency (IF) or base band signals (e.g., filters, amplifiers, etc.), and analog-to-digital conversion in one single package. The RF frontend usually includes multiple reception (RX) and transmission (TX) channels, particularly in applications in which beam steering techniques, phased antenna arrays, etc. are used. In radar applications, phased antenna arrays may be employed to sense an incidence angle of incoming RF radar signals (also referred to as "direction of arrival" or DOA).

In the context of radar MMICs, so-called "cascaded systems" have emerged, whereby multiple MMICs are interconnected to embody a single overall system with increased resolution for radar target discrimination. In a multiple-input multiple-output (MIMO) system, a local oscillator source distributes an RF signal to the transmission and reception channels of each radar MMIC. Additionally, for advanced MIMO and reconfigurable radars it may be useful to have a high number of transmitter outputs on a radar chip, with each transmitter output coupled to a different antenna.

For some applications, the phase relationship between channels, both from an inter-chip and intra-chip perspective, is important. A phase difference between transmission channels can drift or become unbalanced, for example, due to temperature changes. This parameter is called "phase drift," and ensuring low phase drift can be technically challenging. Transmission signal monitoring can be used to measure the phase of each inter-chip and/or intra-chip TX channel, and phase shifters can be used to calibrate each transmission channel based on the result to minimize the phase drift (so-called phase balancing).

Additionally, reception signal monitoring is an operation that may be executed by a radar MMIC to ensure that all units involved in reception of radar signals are working as expected and the received radar data can be trusted for use. In particular, a monitoring subsystem can be used to observe key parameters and performance or health indicators, by means of specific measurements carried out on special test signals, which can highlight faults in the system so that appropriate action can be taken in such occurrences. One common circumstance in which the monitoring subsystem can become ineffective is the presence of interference during the monitoring measurement (e.g., during injection of the monitoring signal or test signal into an RX channel). In such cases, interference may impact the result of the monitoring and be treated as a fault. This may result in part of or the entire system being shut down, despite the possible interference being only a temporary event.

High-resolution (cascading) radar systems employ multiple radar chips, which are synchronized with a trigger signal. For example, radar operations (e.g., radar frames) of the radar chips may be synchronized with the trigger signal. For example, a trigger event (e.g., a trigger pulse) indicated by the trigger signal may trigger synchronized radar operations in the radar chips. The trigger signal is usually generated by a primary chip (e.g., a primary MMIC) and distributed to all radar chips (e.g., to all MMICs, including the primary MMIC) in the radar system using a dedicated distribution network. Any mismatch of the trigger distribution delay between radar chips, or any mismatch between trigger signal distribution and a clock signal distribution, can create synchronization errors between the radar chips, which would need to be constrained or compensated for in order to satisfy system requirements that ensure proper operation of the radar system.

Some implementations disclosed herein are directed to a cascaded radar system in which a trigger signal (e.g., a signaling event or a trigger event) is encoded into a distributed clock signal that is distributed to the MMICs of the cascaded radar system. For example, the trigger signal (e.g., the signaling event or the trigger event) may be encoded into the distributed clock signal by skipping one complete pulse of the distributed clock signal. Thus, an absence of a clock pulse in the distributed clock signal (e.g., the clock signal does not change when the distributed clock signal typically would change if a clock pulse was present) is indicative of a presence of a trigger event corresponding to the trigger signal. As a result, the trigger signal may be distributed to the MMICs of the cascaded radar system together with the distributed clock signal. In other words, the trigger information (e.g., trigger events) and clock information (e.g., clock pulses) are distributed in a single signal.

In some implementations, the primary MMIC employs a modulator M, which removes a clock pulse from the distributed clock signal, or modifies a duty-cycle of a clock pulse in the distributed clock signal, in order to signal a presence of a trigger event. A demodulator D is provided in each of the MMICs, which detects the absence of a clock pulse in the distributed clock signal and creates the trigger signal based on detecting the absence of the clock pulse. The trigger signal is synchronized with a system clock by a synchronizer S before it is delivered to a sequencer (SEQU).

In some implementations, the modulator M may be a clock gate controlled by an internal trigger signal in the primary MMIC. The demodulator D may be an XOR gate which combines a received 50 MHz distributed clock signal with a 200 MHz system clock signal divided by four, which generates a sequence of narrow pulses in the absence of the trigger signal (e.g., absence of a trigger event) and a wide pulse in the presence of a trigger signal (e.g., a presence of a trigger event in an absence of a clock pulse), followed by a low-pass filter and a comparator, which detect the presence of the trigger signal (e.g., detect an absence of a clock pulse in the distributed clock signal).

In another implementation, the demodulator D may be a digital circuit that samples the distributed clock signal using one or both edges of the system clock and detects the absence of a clock pulse in the distributed clock signal (e.g., a presence of the trigger event).

In some implementations, the demodulator D may be used also for detecting a duty-cycle modification for detecting the presence of the trigger event in the distributed clock signal, at the cost of a smaller margin for an analog or a digital comparator.

In some implementations, a phase-locked loop (PLL) of an MMIC receives the distributed clock signal from the primary MMIC. The distributed clock signal may be used as a reference signal of the PLL. The PLL may generate the system clock signal as a PLL output signal from the distributed clock signal.

A frequency f of the PLL output signal may be temporarily distorted from a steady-state value $f0$ of the PLL, when the trigger signal (e.g., the absence of a clock pulse in the distributed clock signal) appears at time $t0$. The frequency of the PLL output signal may first be reduced to a minimum value $fmin$ (e.g., the PLL detects that a feedback clock is faster than the reference signal, which is missing, and slows down an oscillator of the PLL). Then, depending on the loop dynamics of the PLL, the frequency of the PLL output signal is increased to a maximum value fmax, and gradually the frequency of the PLL output signal converges again to the steady-state value f0 at time ts, in which the frequency deviation of the PLL output signal is below a noise level. In some implementations, the frequency deviation is at an order of 1% and a settling time is at an order of 500 reference clock cycles. During this settling, there is no radar activity, and the frequency deviation is small enough for the background digital activity.

In some implementations, the PLL effectively restores the skipped clock pulse in the system clock (e.g., the PLL output signal). The total phase error (e.g., an integral of a frequency error) after settling at time ts, is zero, as long as the frequency deviation around the steady-state value f0 is small. Therefore, digital functions of the MMIC that depend on clock cycle counting are not affected.

In some implementations, the PLL is needed in the above system in order to generate the 200 MHz system clock signal from the 50 MHz distributed clock signal. Systems in which the system clock frequency is the same as the distributed clock frequency may also employ a PLL which does not scale the frequency, in order to filter the distributed clock signal (e.g., a clean-up PLL).

In some implementations, the modulator M can be configured to skip more than one clock pulse. This gives more time to the demodulator D to detect the presence of a trigger signal (e.g., the absence of clock pulses), at the cost of a larger disturbance in the frequency of the system clock signal (e.g., the PLL output signal) and, thus, a larger disturbance in the PLL.

In some implementations, the impact of the trigger (e.g., the skipped pulse) on the system clock signal can be further reduced by disabling a phase detector (PD) and a charge-pump (CP) inside the PLL at a time that the trigger is distributed on the clock signal, using a gating signal. The disabling of the phase detector and the charge-pump inside the PLL also creates a frequency disturbance (e.g., due to mismatch and leakage currents in the PD and the CP) in the system clock signal, but with a much smaller frequency deviation and faster settling time.

In some implementations, the auxiliary gating signal can be generated locally in each secondary MMIC, by detecting a missing rising edge of a skipped pulse of the distrusted clock signal before the missing falling edge of the skipped pulse. The PD of the PLL may be configured to operate with the falling edge of the reference clock (e.g., of the distrusted clock signal). The PD and the CP of the PLL may be disabled at the moment when the missing falling edge in the reference clock is detected, for one or more reference clock cycles.

In some implementations, the auxiliary gating signal is generated centrally (e.g., in a system microcontroller), and the auxiliary gating signal is distributed before the trigger, through another channel, with relaxed timing precision.

In some implementations, the auxiliary gating signal can be generated locally in each MMIC, periodically every configurable number of clock cycles, after a first synchronization at startup. The primary MMIC may distribute the trigger signal in the distributed clock signal by pulse skipping, only when the auxiliary gating signal is present (e.g., only when auxiliary gating is signaled). Therefore, the system clock signal is disturbed periodically by a very small amount, until the trigger signal (skipped pulse) is distributed, after which the auxiliary trigger gating signal is disabled in all MMICs until a radar operation (e.g., a radar frame) is finished.

In some implementations, a periodic trigger gating signal is generated locally in each MMIC. Each MMIC may employ a state machine, which starts at state 0 and switches to state 1 after a first synchronization at startup. The state machine, after a configurable number of clock cycles, switches periodically to state 2 for one clock cycle, during which the trigger gating signal is enabled. The primary MMIC distributes the trigger signal by pulse skipping only when the trigger gating signal is present. Therefore, the system clock is disturbed periodically by a very small amount, until the trigger signal (skipped pulse) is distributed, after which the state machine switches to state 3 and the trigger gating signal is disabled in all MMICs, until the radar operation is finished and the state machine switches back to state 1.

In some implementations, a signaling scheme in which a down-pulse is removed may be used in order to signal the presence of a trigger, leaving three consecutive half-periods in the clock signal at a high signal level instead of a low signal level. This signaling scheme may be preferable for the local generation of auxiliary gating signals, in case the PD of the PLL operates with a rising edge of the reference clock.

In some implementations, an external buffer may be provided for the clock distribution, since both pulse skipping and duty-cycle modification are compatible with an external buffer.

In some implementations, the MMICs may not include PLLs for frequency scaling and/or clean-up. In such systems, the distributed clock signal may be used by an MMIC as the system clock signal. As a result, there is a skipped pulse in the system clock signal at the time of a trigger event, which does not affect radar operations, but must be tolerated or compensated for in background digital operations depending on clock cycles counting.

Accordingly, there is no need for a dedicated trigger distribution network, which may simplify a system board design of the cascaded radar system. Additionally, there is no mismatch between the trigger signal (e.g., the signaling events) and the clock signal distribution, since they are both distributed together over the same distribution network. Thus, synchronization errors between the MMICs can be reduced or prevented. The settling of the PLL, which is a side-effect of the trigger signaling with pulse skipping, may require an earlier transmission of a radar operation command from the system microcontroller to the primary MMIC.

FIG. 1 is a diagram illustrating an example application of a frequency-modulated continuous-wave (FMCW) radar sensor in the form of a radar sensor 100 for measuring distances, velocities, or angle of arrivals (AoAs) associated with objects, referred to as targets. As shown in FIG. 1, the radar sensor 100 may have one or more TX antennas 102 and one or more RX antennas 104. In some implementations, a single antenna may be used that serves simultaneously as a TX antenna 102 and as an RX antenna 104.

In operation, the TX antenna 102 continuously emits an RF signal $s_{RF}(t)$ (also referred to as a transmitted radar signal), which is frequency-modulated, for example, by a periodic linear frequency ramp signal (also referred to as a frequency sweep or chirp signal). The transmitted radar signal $s_{RF}(t)$ is backscattered at a target T and a reflected signal $y_{RF}(t)$ (e.g., a back-scattered signal, an echo signal, a received RF signal, or a received radar signal) is received by the RX antenna 104. FIG. 1 shows a simplified example—in practice, the radar sensor 100 may include a plurality of TX antennas 102 and RX antennas 104 to be able to determine an AoA of the received RF signal $y_{RF}(t)$ and, therefore, locate the target T with increased accuracy compared to a radar sensor that may use a single TX antenna and/or a signal RX antenna.

It will be appreciated that "(t)" denotes an analog signal defined as a continuous-time signal that may change over a time period t, and "[n]" denotes a digital signal defined as a discrete-time signal, where n is an integer and may represent an nth sample or a signal containing n samples. A signal may be represented with or without its continuous-time or discrete-time domain identifier (t) and [n], respectively. It will be further appreciated that RF circuits, such as the radar sensor 100, may be used in fields other than radar. For example, RF circuits may be used in RF communication systems. Accordingly, in some implementations, the radar sensor 100 may be used in RF applications other than radar, such as RF communications.

As indicated above, FIG. 1 is provided as an example. Other examples may differ from what is described with regard to FIG. 1.

Figure 2:
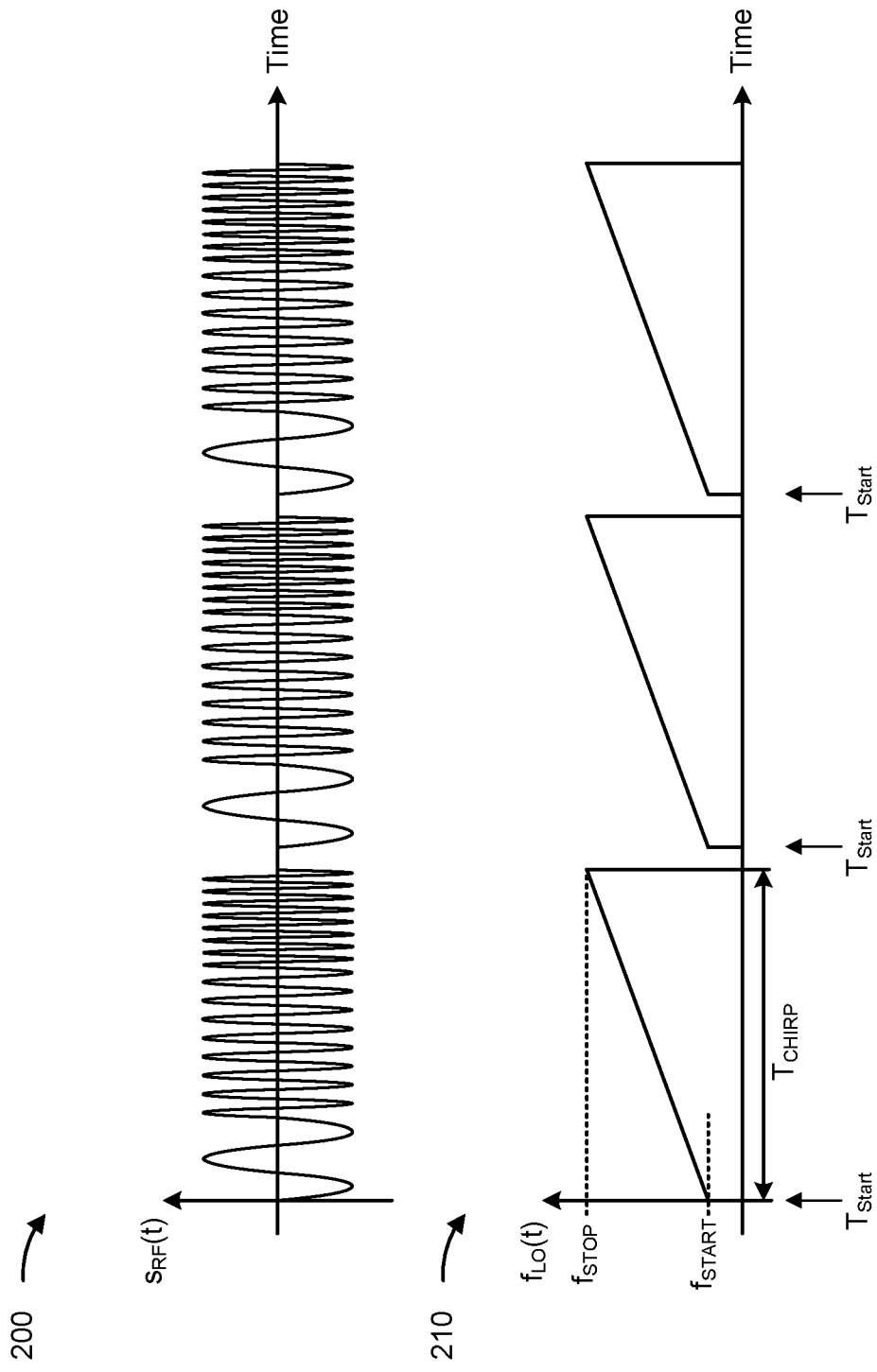
FIG. 2 illustrates an example of frequency modulation of a transmitted radar signal transmitted by the FMCW radar sensor.

FIG. 2 illustrates an example of the frequency modulation of the RF signal $s_{RF}(t)$. As illustrated in the upper diagram 200 of FIG. 2, the RF signal $s_{RF}(t)$ comprises a plurality of frequency ramps or series of "chirps"; that is to say, the RF signal $s_{RF}(t)$ comprises a sequence of sinusoidal signal profiles (e.g., waveforms) with a rising frequency (referred to as an up-chirp) or a falling frequency (referred to as a down-chirp). In the example shown in FIG. 2, the instantaneous frequency $f_{LO}(t)$ of a chirp increases linearly, starting at a start frequency $f_{START}$, to a stop frequency $f_{STOP}$ within a time interval $T_{CHIRP}$, as shown in the lower diagram 210 of FIG. 2. Such chirps are also referred to as linear frequency ramps. For a measurement, a sequence of frequency ramps is emitted, and a resulting echo signal is evaluated in baseband to detect one or more radar targets.

A frequency-modulated ramp signal, such as a local oscillator signal used for generating a radar signal, may include a plurality of radar frames, which may also be referred to as radar operation cycles or chirp frames. A sequence of ramps may make up each radar frame. For example, a radar operation cycle may include several hundreds of radar ramps (sweeps) taking up to 10-30 milliseconds (ms) in total. A frame length of the radar frame may correspond to one radar operation cycle. Consecutive ramps may have a short pause therebetween, and a longer pause may be used between consecutive radar frames. The longer pause between consecutive radar frames may be referred to as a configuration interval, during which one or more ramp parameters of the RF signal $s_{RF}(t)$ can be adjusted for subsequent radar frames. A ramp start time $T_{START}$ indicates a start time for each chirp and may occur at a predetermined interval according to, for example, a number of clock cycles.

The start frequency $f_{START}$ and stop frequency $f_{STOP}$ of the ramps may be within a frequency band with minimum frequency Fmin and maximum frequency Fmax. As a result, the minimum frequency Fmin and the maximum frequency Fmax define an operating frequency range or a frequency band usable for the ramping signals, and thus the frequency range or the frequency band of the radar application of a radar MMIC. In some implementations, the frequency range defined by a single ramp having start and stop frequencies $f_{START}$ and $f_{STOP}$ may be smaller than the usable radar frequency band. However, all ramps that are generated during operation may lie between the frequencies Fmin and Fmax of the radar frequency band (e.g., between 76-81 GHz) used for generating the ramping signals.

FIG. 2 illustrates three identical linear frequency ramps or chirps. However, the parameters $f_{START}$, $f_{STOP}$, $T_{CHIRP}$, and/or the pause between the individual frequency ramps may vary dependent on the actual implementation and use of the radar sensor 100. In practice, the frequency variation may be, for example, linear (linear ramp, frequency ramp), exponential (exponential ramp), or hyperbolic (hyperbolic ramp). In some implementations, the frequency may decrease instead of increase during time interval $T_{CHIRP}$. Furthermore, in some implementations, a center frequency of each ramp (and therefore $f_{START}$ and $f_{STOP}$) may vary (e.g., from ramp to ramp or after detecting an interference) to allow using the full or a part of the frequency band. In one example, the frequency band has a minimum frequency Fmin of 76 gigahertz (GHz) and a maximum frequency Fmax of 81 GHz.

Thus, while three identical linear frequency ramps or chirps with the same start frequency $f_{START}$ and stop frequency $f_{STOP}$ are illustrated in FIG. 2, it is contemplated that the start frequency $f_{START}$ and stop frequency $f_{STOP}$ may vary within a radar frame or across multiple radar frames. A local oscillator signal $S_{LO}(t)$ may be used to generate the RF signal $S_{RF}(t)$. Thus, it can be said that the local oscillator signal $S_{LO}(t)$ and the RF signal $S_{RF}(t)$ are frequency-modulated ramp signals that are generated within an operating frequency range (e.g., a predefined radar frequency range). For example, the local oscillator signal $S_{LO}(t)$ may be a frequency-modulated ramp signal that includes a plurality of frequency ramps, each starting at a respective ramp start frequency and ending at a respective ramp stop frequency, and the respective ramp start frequencies and the respective ramp stop frequencies of the plurality of frequency ramps define a frequency range within the bounds of the operating frequency range. The frequency range of the plurality of frequency ramps may be defined by the lowest start frequency $f_{START}$ and the highest stop frequency $f_{STOP}$ among the frequency ramps in a given time interval (e.g., in an implementation in which the frequency increases within each frequency ramp). As noted above, the start frequency $f_{START}$ and the stop frequency $f_{STOP}$ of a sequence of frequency ramps may be the same, and thus the center frequency of each ramp may be constant. Alternatively, the center frequency of each ramp (and therefore $f_{START}$ and $f_{STOP}$) may vary from ramp to ramp or after detecting an interference. The bandwidth (e.g., frequency range) of each ramp may also vary from ramp to ramp or after detecting an interference.

As indicated above, FIG. 2 is provided as an example. Other examples may differ from what is described with regard to FIG. 2.

Figure 3:
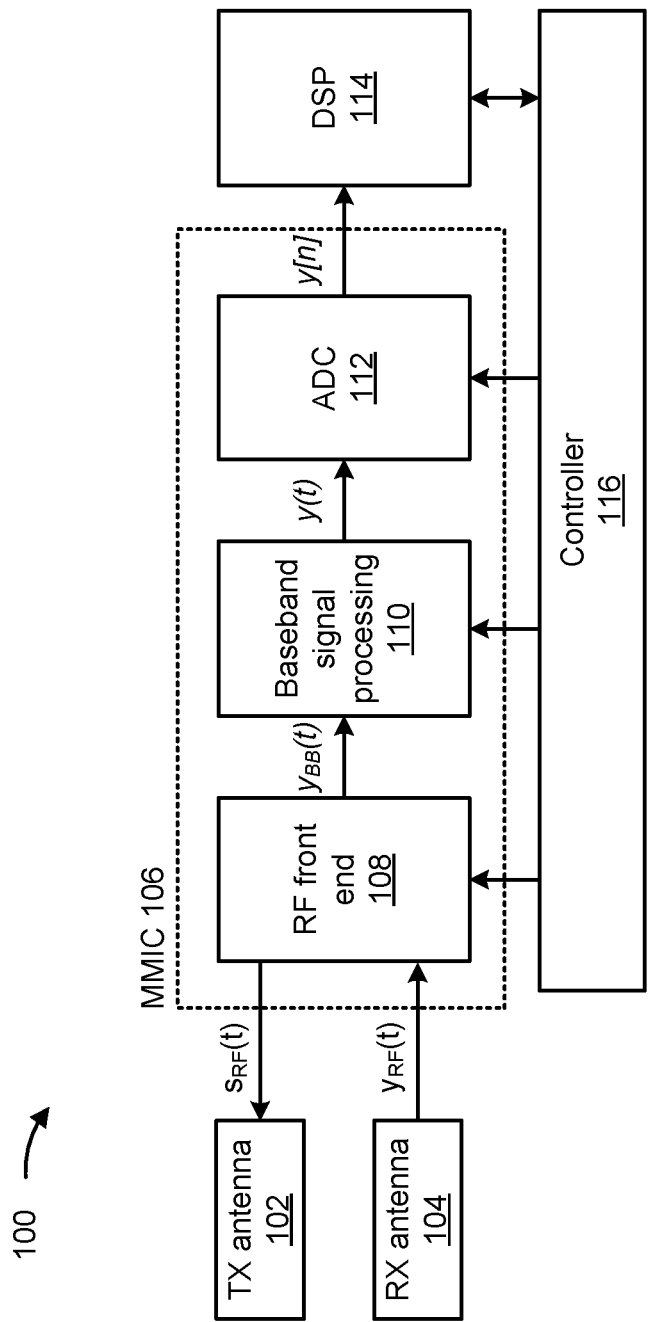
FIG. 3 is a block diagram that illustrates an example structure of the FMCW radar sensor.

FIG. 3 is a block diagram that illustrates an example structure of the radar sensor 100. As shown, the radar sensor 100 may include one or more TX antennas 102, one or more RX antennas 104, an MMIC 106 (comprising an RF front-end 108, a baseband signal processing circuit 110, and an analog-to-digital convertor (ADC) 112), a digital signal processor (DSP) 114, and a controller 116. In some implementations, the MMIC may include a digital front-end (DFE) coupled downstream from the ADC 112. The digital front-end may include circuit components associated with performing signal processing on a digital signal generated by the ADC 112 (e.g., digital filtering). In some cases, the DFE may include the DSP 114.

In the radar sensor 100, the one or more TX antennas 102 and the one or more RX antennas 104 are connected to the RF front-end 108. The RF front-end 108 may include circuit components associated with performing RF signal processing. These circuit components may include, for example, a local oscillator (LO), one or more RF power amplifiers, one or more LNAs, one or more directional couplers (e.g., rat-race couplers, circulators, or the like), or one or more mixers for downmixing (e.g., down-converting or demodulating) RF signals into baseband or an intermediate frequency band (IF band). The RF front-end 108 may be integrated into the MMIC 106 with one or more other components, as shown in FIG. 3. The IF band is sometimes also referred to as baseband. Accordingly, "baseband" and "IF band" may be used interchangeably herein. Baseband signals are those signals on the basis of which radar targets are detected.

Antenna-arrays may be used instead of single antennas. The depicted example shows a bistatic radar system or a pseudo-monostatic radar system, which has separate RX and TX antennas. In the case of a monostatic radar system, a single antenna or a single antenna array may be used to both receive and transmit electromagnetic (radar) signals. In this case, a directional coupler (e.g., a circulator) may be used to separate RF signals to be transmitted to the radar channel from RF signals received from the radar channel. In practice, radar systems often include several TX and RX channels, which allows the measurement of the direction (e.g., direction of arrival) from which the radar echoes are received.

In some implementations, the radar sensor 100 may include a plurality of TX antennas 102 and a plurality of RX antennas 104, which enables the radar sensor 100 to measure an AoA from which radar echoes are received. In the case of such MIMO systems, individual TX channels and RX channels may be constructed identically or similarly and may be distributed over one or more MMICs 106.

In some implementations, a signal emitted by the TX antenna 102 may be in a range from approximately 20 GHz to approximately 100 GHz, such as in a range between approximately 76 GHz and approximately 81 GHz. As mentioned, a radar signal received by the RX antenna 104 includes radar echoes (e.g., chirp echo signals); that is to say, those signal components that are backscattered at one or more targets.

The received RF signal $y_{RF}(t)$ is downmixed into, for example, baseband to generate a baseband signal $y_{BB}(t)$, and the baseband signal $y_{BB}(t)$ is processed further in baseband by way of analog signal processing performed by the baseband signal processing circuit 110. In some implementations, the baseband signal processing circuit 110 may be configured to filter and/or amplify the baseband signal $y_{BB}(t)$ to generate an analog (baseband) output signal y(t) that is derived from the baseband signal $y_{BB}(t)$. The baseband signal $y_{BB}(t)$ may also be referred to as analog radar data. If the received RF signals are down-converted into the IF band, the baseband signal processing circuit 110 may be referred to as an IF signal processing circuit. Thus, the baseband signal processing circuit 110, in general, may also be referred to as an analog signal processing circuit.

The ADC 112 may be configured to digitize the baseband signal $y_{BB}(t)$ or the analog output signal y(t) to generate a digital baseband signal y[n], also referred to as a digital output signal. The digital baseband signal y[n] is representative of the radar data received in the received RF signal $y_{RF}(t)$. The DSP 114 may be configured to further process the digital baseband signal y[n] in the digital domain. For example, the DSP 114 may be configured to receive the digital radar data in the digital baseband signal y[n] and process the digital radar data using the ramp parameters (e.g., respective ramp start frequencies, the respective ramp stop frequencies, a bandwidth of a frequency range, a ramp start time, or a sampling start time) used to generate the respective frequency ramps of the received RF signal $y_{RF}(t)$ in order to generate a range Doppler map, which may then be further used by the DSP 114 for object detection, classification, and so on.

In some implementations, the controller 116 is configured to control operation of the radar sensor 100 (e.g., by controlling one or more other components of the radar sensor 100, as indicated in FIG. 3). The controller 116 may include, for example, a microcontroller (μC).

In some implementations, the RF front-end 108, the baseband signal processing circuit 110, the ADC 112, and/or the DSP 114 may be integrated in a single MMIC 106 (e.g., an RF semiconductor chip). Alternatively, two or more of these components may be distributed over multiple MMICs 106. In some implementations, the DSP 114 may be included in the controller 116. In some implementations, the techniques associated with TX monitoring and/or RX monitoring may be performed by one or more components of the radar sensor 100, such as by the DSP 114, the controller 116, or the like.

As indicated above, FIG. 3 is provided as an example. Other examples may differ from what is described with regard to FIG. 3. The number and arrangement of devices and components shown in FIG. 3 are provided as an example. In practice, there may be additional devices or components, fewer devices or components, different devices or components, or differently arranged devices or components than those shown in FIG. 3. Furthermore, two or more devices or components shown in FIG. 3 may be implemented within a single device or component, or a single device or component shown in FIG. 3 may be implemented as multiple, distributed devices or components. Additionally, or alternatively, a set of devices or components (e.g., one or more devices or components) shown in FIG. 3 may perform one or more functions described as being performed by another set of devices or components shown in FIG. 3.

Figure 4:
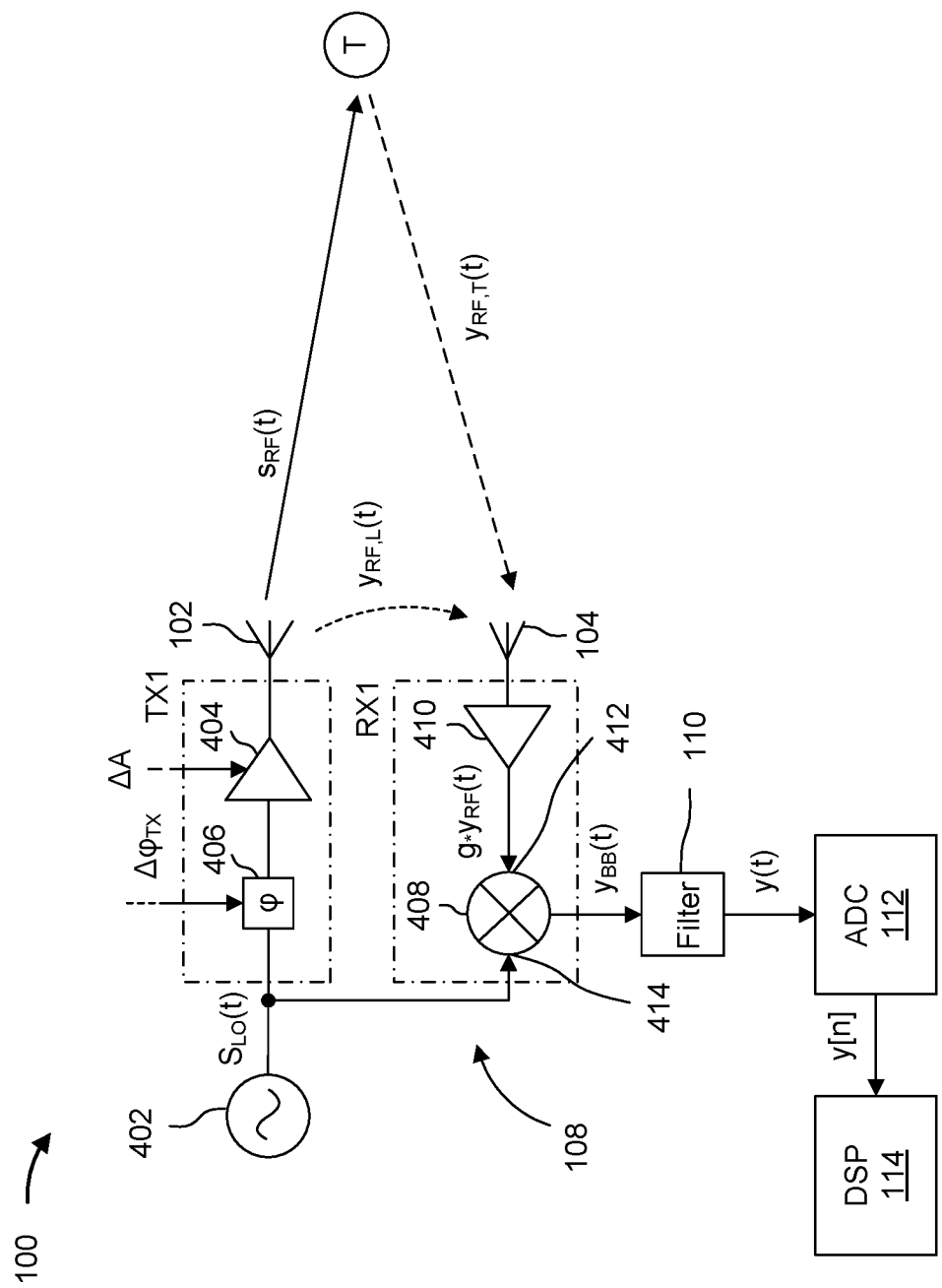
FIG. 4 illustrates an example implementation of the FMCW radar sensor according to the example from FIG. 3.

FIG. 4 illustrates an example implementation of the radar sensor 100 according to the example from FIG. 3. The example shown in FIG. 4 illustrates an example of the RF front-end 108 of the radar sensor 100. FIG. 4 illustrates a simplified circuit diagram to show a fundamental structure of the RF front-end 108 with one TX channel TX1 and one RX channel RX1. As noted above, the radar sensor 100 may in practice include a plurality of TX channels and/or a plurality of RX channels.

The RF front-end 108 comprises an LO 402 that generates an RF oscillator signal $S_{LO}(t)$. The RF oscillator signal $S_{LO}(t)$ is frequency-modulated during operation (e.g., as described above with reference to FIG. 2) and may also be referred to as an LO signal, an input RF signal, or a reference signal. In radar applications, the LO signal may be in a super high frequency (SHF) band (e.g., centimeter wave) or in an extremely high frequency (EHF) band (e.g., millimeter wave), for example, in a range between approximately 76 GHZ and approximately 81 GHz. In some radar applications, the LO signal may be in a 24 GHz industrial, scientific, and medical (ISM) band. The LO signal may also be generated at a lower frequency and then up-converted using frequency multiplication units. The LO signal $s_{LO}(t)$ is processed both in the transmitted radar signal path TX1 (in the TX channel) and in the received RF signal path RX1 (in the RX channel).

While the local oscillator 402 may be provided on a chip, the local oscillator 402 may also be provided external thereto. For example, the LO signal may be provided by an external local oscillator, and/or the LO signal may be provided to the MMIC 106 by another MMIC in a primary/secondary relationship. In particular, the MMIC 106 may be part of a MIMO radar system comprising a plurality of coupled (cascaded) MMICs in which one of the MMIC is configured as a primary MMIC and the remaining MMICs are configured as secondary MMICs. Each of the MMICs may include a local oscillator that generates a respective RF oscillator signal $S_{LO}(t)$. However, for the operation of the MIMO radar system, it may be beneficial for LO signals used by the MMICs to be coherent. Therefore, the LO signal may be generated in one MMIC (e.g., the primary MMIC), and a representation of the LO signal may be distributed to the secondary MMICs. The representation may, for example, be identical to the LO signal, or the representation may be a frequency-divided signal which is then reconstructed at each MMIC by frequency multiplication. While in the following description, a distribution of the LO signal will be described, the following description may also be applied to a frequency-divided distribution of the LO signal. In some implementations, the primary MMIC may also use the LO signal to feed itself via a signal loop to ensure that the LO signal is equally delayed between the primary MMIC and the secondary MMICs.

The RF oscillator signal $S_{LO}(t)$ is processed both in the transmission signal path TX1 (in the TX channel) and in the received signal path RX1 (in the RX channel). The RF signal $S_{RF}(t)$ (i.e., the outgoing radar signal) transmitted by the TX antenna 102 may be generated by amplifying the RF oscillator signal $S_{LO}(t)$, for example by an RF power amplifier 404, and may therefore be an amplified and possibly phase-shifted (e.g., by a phase shifter 406) version of the RF oscillator signal $S_{LO}(t)$. The transmission channel may also include a phase shifter 406 for applying a programmable phase shift $\varphi$ to the RF oscillator signal $S_{LO}(t)$. For example, the phase shifter 406 may be configurable by a phase control signal $\Delta\varphi_{TX}$ and may be used to manipulate the overall phase lag caused by the transmission channel TX1. The magnitude or power level (e.g., gain) of the RF power amplifier 404 may also be programmable and adjustable by a gain control signal $\Delta A$.

Both the phase control signal $\Delta\varphi_{TX}$ and the gain control signal 44 may be set and adjusted by a controller of the radar sensor 100 (e.g., controller 116). For example, by setting the power level of the RF power amplifier 404, the transmit power of the transmission channel TX1 may be set to a transmission power while the local oscillator 402 generates the RF oscillator signal $S_{LO}(t)$ with the frequency ramps intended to be transmitted as the RF signal $S_{RF}(t)$ (e.g., the transmission signal) and received as the received RF signal $y_{RF}(t)$ for the processing of radar data. The output of the RF power amplifier 404 can be coupled to the TX antenna 102 (in the case of a bistatic/pseudo-monostatic radar configuration). In some cases, the power level of the RF power amplifier 404 may be set to zero to disable the transmission channel TX1 (e.g., to disable a transmission of the RF signal $S_{RF}(t)$). In other words, while the power level of the RF power amplifier 404 is set to zero, the output power of the RF power amplifier 404 is zero and no signal is provided to the TX antenna 102.

The RX channel RX1 includes a mixer 408 and an optional amplifier 410. The received RF signal $y_{RF}(t)$ received by the RX antenna 104 is supplied to a receiver circuit in the RX channel RX1 and hence directly or indirectly to an RF port 412 of the mixer 408. In the present example, the received RF signal $y_{RF}(t)$ (antenna signal) is pre-amplified by the amplifier 410 with a gain g. The mixer 408 thus receives the amplified received RF signal $g \cdot y_{RF}(t)$. The amplifier 410 can be, for example, a low-noise amplifier.

The mixer 408 further includes a reference port 414 that may be supplied with the RF oscillator signal $S_{LO}(t)$ so that the mixer 408 down-converts the (pre-amplified) received RF signal $y_{RF}(t)$ to the baseband (or the IF band). The down-converted baseband signal (mixer output signal) is denoted by $y_{BB}(t)$. This baseband signal $y_{BB}(t)$ is processed further in the analog domain by the baseband signal processing circuit 110, substantially causing an amplification and a filtering (e.g., bandpass filtering, low-pass filtering, and/or high-pass filtering) in order to, for example, reject undesirable sidebands and/or mirror frequencies. The resulting analog output signal is denoted by y(t) and is supplied to the ADC 112. The ADC 112 is configured to convert the analog output signal y(t) into the digital baseband signal y[n] (e.g., the digital output signal) that undergoes further digital post-processing via a signal processor (e.g., the DSP 114). Further digital processing of the digital baseband signal y[n] may include, for example, range Doppler analysis.

In the present example, the mixer 408 may down-convert the pre-amplified received RF signal $g \cdot y_{RF}(t)$ (e.g., the amplified antenna signal) into baseband. In some implementations, the mixing may be performed in one stage (e.g., from the RF band directly into baseband) or over one or more intermediate stages (e.g., from the RF band into an intermediate frequency band, and further into baseband). In the latter case, the mixer 408 may comprise a plurality of individual mixer stages connected in series. In some implementations, a mixer stage may include an in-phase and quadrature (IQ) mixer that generates two baseband signals (in-phase and quadrature signals) that can be interpreted as a real part and an imaginary part of a complex baseband signal. In other words, the IQ mixer may be used to generate complex baseband signals (e.g., including in-phase and quadrature components).

As depicted in FIG. 4, the RX antenna 104 of the RX channel RX1 may receive a superimposition comprising a received RF signal $y_{RF,T}(t)$ reflected from the target T and a direct crosstalk from the transmitting antenna 102, which is also referred to as leakage signal $y_{RF,L}(t)$. Reflections from an object situated right in front of the antennas (sometimes also called "blockers") are also referred to as crosstalk here, and may contribute to the leakage signal. Both signals $y_{RF,T}(t)$ and $y_{RF,L}(t)$ are substantially delayed and attenuated versions of the RF signal $S_{RF}(t)$ of the transmission channel TX1. A time delay between the RF signal $S_{RF}(t)$ of the transmission channel TX1 and the received leakage signal $y_{RF,L}(t)$ (e.g., the crosstalk signal) is relatively short in comparison with a time delay of the received RF signal $y_{RF,T}(t)$ received from the target T. In a normal radar mode, the received leakage signal $y_{RF,L}(t)$ may therefore cause a corresponding low-frequency component in the baseband signal $y_{BB}(t)$, and this low-frequency component of the baseband signal $y_{BB}(t)$ may be rejected in the baseband signal processing circuit 110. For this purpose, the baseband signal processing circuit 110 may include a bandpass filter, a low-pass filter, and/or a high-pass filter having a suitable cut-off frequency.

As indicated above, FIG. 4 is provided as an example. Other examples may differ from what is described with regard to FIG. 4. The number and arrangement of devices and components shown in FIG. 4 are provided as an example. In practice, there may be additional devices or components, fewer devices or components, different devices or components, or differently arranged devices or components than those shown in FIG. 4. Furthermore, two or more devices or components shown in FIG. 4 may be implemented within a single device or component, or a single device or component shown in FIG. 4 may be implemented as multiple, distributed devices or components. Additionally, or alternatively, a set of devices or components (e.g., one or more devices or components) shown in FIG. 4 may perform one or more functions described as being performed by another set of devices or components shown in FIG. 4.

Figure 5:
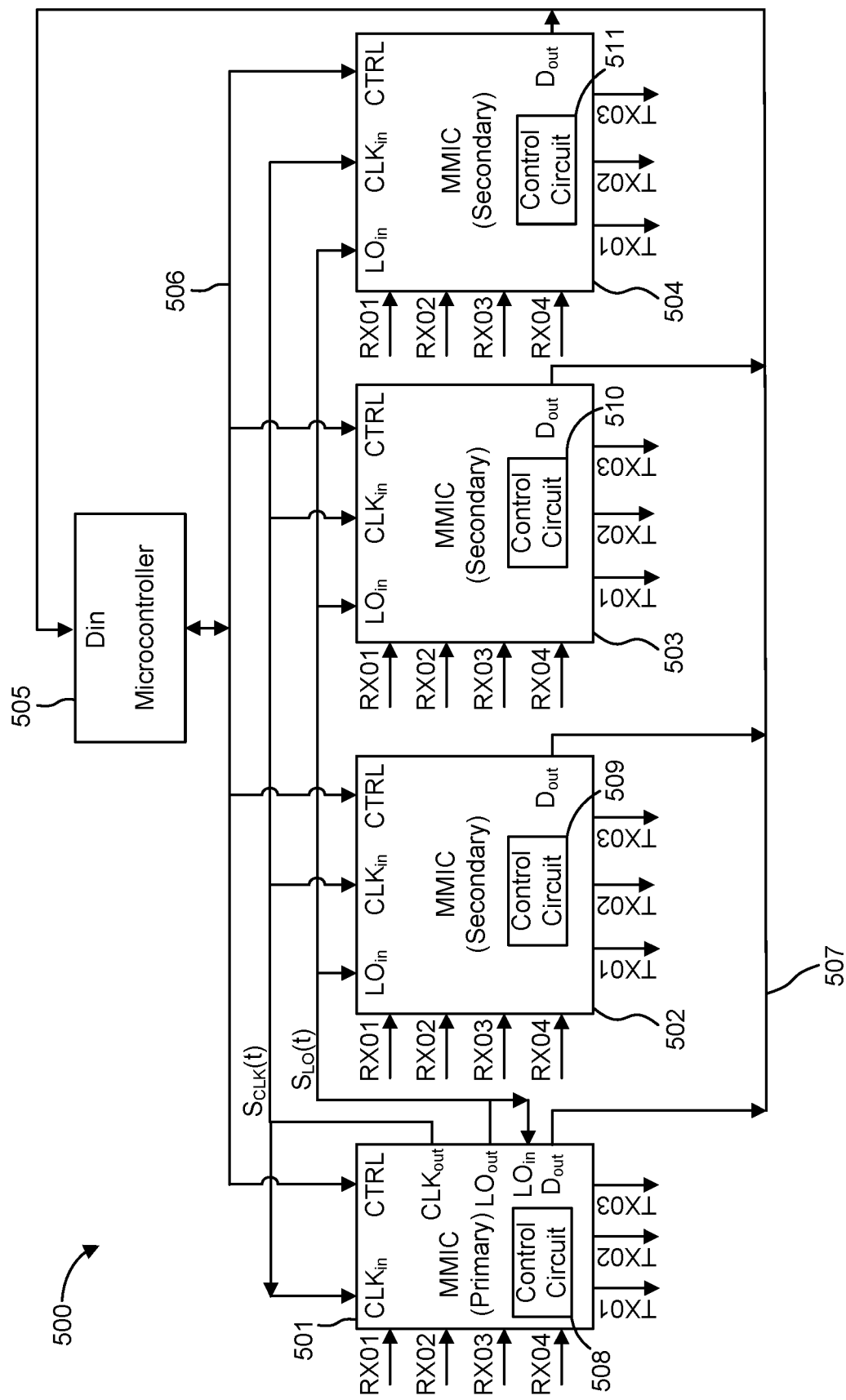
FIG. 5 is a schematic block diagram for illustrating a cascaded radar system comprising a controller and a plurality of cascaded monolithic microwave integrated circuits (MMICs) according to one or more implementations.

FIG. 5 is a block diagram for illustrating a cascaded radar system 500 comprising a controller and a plurality of cascaded MMICs according to one or more implementations. In particular, the cascaded radar system 500 is a MIMO radar system comprising a plurality of coupled (cascaded) MMICs 501, 502, 503, and 504 that are further coupled to a microcontroller 505. The microcontroller 505 may implement some of the functionality of the controller 116 described in connection with FIG. 3. While the microcontroller 505 is shown external to the MMICs 501-504, the microcontroller 505 may be integrated within one of the MMICs 501-504 while performing the same functions described herein. In addition, the MMIC 501 may be configured as a primary MMIC and the MMICs 502, 503, and 504 may be configured as secondary MMICs. For example, a secondary MMIC may use one or more signals and/or information provided by the primary MMIC to perform one or more functions.

Each MMIC 501, 502, 503, and 504 can comprise a plurality of transmitting channels TX01, TX02, TX03 and a plurality of receiving channels RX01, RX02, RX03, RX04. Each of the transmitting channels may be coupled to a respective transmit antenna for transmitting radar signals and each of the receiving channels may be coupled to a respective receive antenna for receiving (reflected) radar signals. However, as noted above, it is also possible that an MMIC only includes a receiver with no transmitter or a transmitter with no receiver. Thus, in some cases, an MMIC may not include any transmitting channels or may not include any receiving channels.

Each of the MMICs 501-504 may include a local oscillator (LO) that generates an RF oscillator signal $S_{LO}(t)$ (e.g., an LO signal). However, for the operation of the cascaded radar system 500, it may be beneficial for the LO signals used by the MMICs 501-504 to be coherent. Therefore, the RF oscillator signal $S_{LO}(t)$ may be generated in one MMIC (e.g., MMIC 501 as the primary MMIC) and distribute a representation of the RF oscillator signal $S_{LO}(t)$ to the secondary MMICs 502, 503, and 504. For example, the representation of the RF oscillator signal $S_{LO}(t)$ may be identical to the RF oscillator signal $S_{LO}(t)$, or the representation of the RF oscillator signal $S_{LO}(t)$ may be a frequency-divided signal which is then reconstructed at each secondary MMIC by frequency multiplication.

While in the following a distribution of the RF oscillator signal $S_{LO}(t)$ will be described, a frequency-divided distribution of the RF oscillator signal $S_{LO}(t)$ may also be used in some implementations. In the example illustrated, for this purpose, the RF oscillator signal $S_{LO}(0)$ is passed from an LO output $LO_{out}$ of the primary MMIC 501 to the LO inputs $LO_{in}$ of respective secondary MMICs 502, 503, and 504. In some implementations, a unidirectional power splitter may first receive the RF oscillator signal $S_{LO}(t)$ from the primary MMIC 501, and distribute the split signal to the LO inputs $LO_{In}$ of the secondary MMICs 502, 503, and 504. In some implementations, the LO output $LO_{out}$ of the primary MMIC 501 may be coupled to the LO input $LO_{in}$ of the primary MMIC 510 such that the primary MMIC 501 can feed itself the RF oscillator signal $S_{LO}(t)$ to make sure the RF oscillator signal $S_{LO}(t)$ is equally delayed between the primary MMIC 501 and the secondary MMICs 502, 503, and 504.

The LO output $LO_{out}$ and the LO inputs $LO_{in}$ can be realized as a pin, a solder ball, or the like, depending on the chip package of the MMIC. In some example implementations, the LO output $LO_{out}$ and/or the LO inputs $LO_{in}$ can be realized by dedicated external contacts (e.g., pin, solder ball, etc.). In order to keep the number of external contacts of the MMICs small, the output of a transmitting channel (e.g., channel TX03) can also be reconfigured as LO output or LO input. However, a transmitting channel configured as LO output or LO input is then no longer available as an antenna port for connection to a (transmitting) antenna. In accordance with the example illustrated in FIG. 5, in the primary MMIC 501, the RF output of the transmitting channel TX03 can be configured as LO output, for which purpose it is useful to adapt the gain of the RF amplifier (cf. FIG. 4, amplifier 404). The resultant adaptation (reduction) of the signal power may be useful or expedient in order to minimize the crosstalk to the receiving channels RX01, RX02, etc., and in order to save energy. In the case of secondary MMICs 502, 503, and 504, the RF outputs of the respective transmitting channels TX03 may be configured as LO inputs, which can be realized by means of couplers and/or switches.

In the example illustrated in FIG. 5, the outputs designated by TX01, TX02, and TX03 can be connected to (transmitting) antennas, and the inputs designated by RX01, RX02, RX03 and RX04 can be connected to (receiving) antennas. All of the MMICs 501-504 can each comprise a local oscillator (e.g., local oscillator 402), but the local oscillators may not be used in the MMICs 502-504 that are configured as secondary MMICs. For normal radar operation, the RF oscillator signal $S_{LO}(f)$ may be generated centrally in the primary MMIC 501 and distributed to the secondary MMICs 502-504. As a result, the RF oscillator signals $S_{LO}(t)$ processed in the MMICs 501-504 are coherent.

In the example illustrated in FIG. 5, the primary MMIC 501 may generate the RF oscillator signal $S_{LO}(t)$ and distribute the RF oscillator signal $S_{LO}(f)$ via the LO output of the primary MMIC 501 to the secondary MMICs 502, 503, and 504. As a result, the MMICs 501-504 can be connected in a cascaded configuration. A clock signal $S_{CLK}(t)$ (e.g., a system clock signal) can likewise be generated by the primary MMIC 501 and distributed to the secondary MMICs 502, 503, and 504. The primary MMIC 501 may generate the clock signal $S_{CLK}(f)$ from a reference clock signal received from a separate reference clock generator, such as a quartz oscillator. For this purpose, the MMICs 501, 502, 503, and 504 each have a separate clock output CLKout or clock input CLKin, which can be connected by means of strip lines. The clock signal $S_{CLK}(t)$ can have a clock frequency in a megahertz (MHz) range (e.g., 200 MHz), whereas the LO signal may have an LO frequency $f_{LO}$ of a plurality of GHz (e.g., 76-81 GHz) or a corresponding divided value (e.g., 13 GHz or 39 GHz).

Alternatively, the clock signal $S_{CLK}(f)$ can be generated by the reference clock. In this case, the clock signal $S_{CLK}(O)$ generated by the clock generator chip is fed to all of the MMICs (primary MMIC 501 and secondary MMICs 502-504).

In some implementations, the microcontroller 505 may be configured to transmit control signals to the MMICs 501, 502, 503, and 504 using a control signal bus 506. The control signals may be used to control one or more functions of the MMICs 501, 502, 503, and 504. The control signals may be received at a control input CTRL of the MMICs 501, 502, 503, and 504. The control signals may be provided from the control input CTRL to a processing component of a respective MMIC. For example, the processing component may be an integrated controller or other processing circuitry of the respective MMIC.

In some implementations, each MMIC 501, 502, 503, and 504 may further include a data output Dout for transmitting data. The data from each MMIC 501, 502, 503, and 504 may be transmitted as feedback information to the microcontroller 505 that receives the data at a data input Din. Based on the received data from one or more of the MMICs 501, 502, 503, and 504, the microcontroller 505 may control one or more functions of one or more of the MMICs 501-504. For example, the microcontroller 505 may be configured to receive the data from the MMICs 501, 502, 503, and 504 via a data bus 507 and generate control signals based on the received data. In some implementations, the control signals may be disable signals or enable signals that control the activation and deactivation of the radar signal channels, including transmitting channels and/or receiving channels, at each MMIC 501, 502, 503, and 504. In some implementations, the control signals may be phase control signals that control a phase of one or more of the radar signal channels. For example, the phase control signals may be used to control a phase setting of the phase shifters 406 of the MMICs 501, 502, 503, and 504.

Each MMIC 501, 502, 503, and 504 may include a control circuit 508-511 (e.g., a radar operation controller) that is configured to control one or more components of a corresponding MMIC. A control circuit 508-511 may implement some of the functionality of the controller 116 described in connection with FIG. 3. For example, each control circuit 508-511 may trigger a start of a radar frame that comprises a sequence of frequency ramps for its corresponding MMIC. In some implementations, each control circuit 508-511 may initiate a radar frame by starting a transmission of the sequence of frequency ramps. Each control circuit 508-511 may initiate the radar frame based on receiving a trigger. In some implementations, each control circuit 508-511 may generate phase information based on a monitoring operation and output the phase information via a respective data output Dout. In some implementations, each control circuit 508-511 may receive control signals from the microcontroller 505.

As indicated above, FIG. 5 is provided as an example. Other examples may differ from what is described with regard to FIG. 5.

Figure 6A:
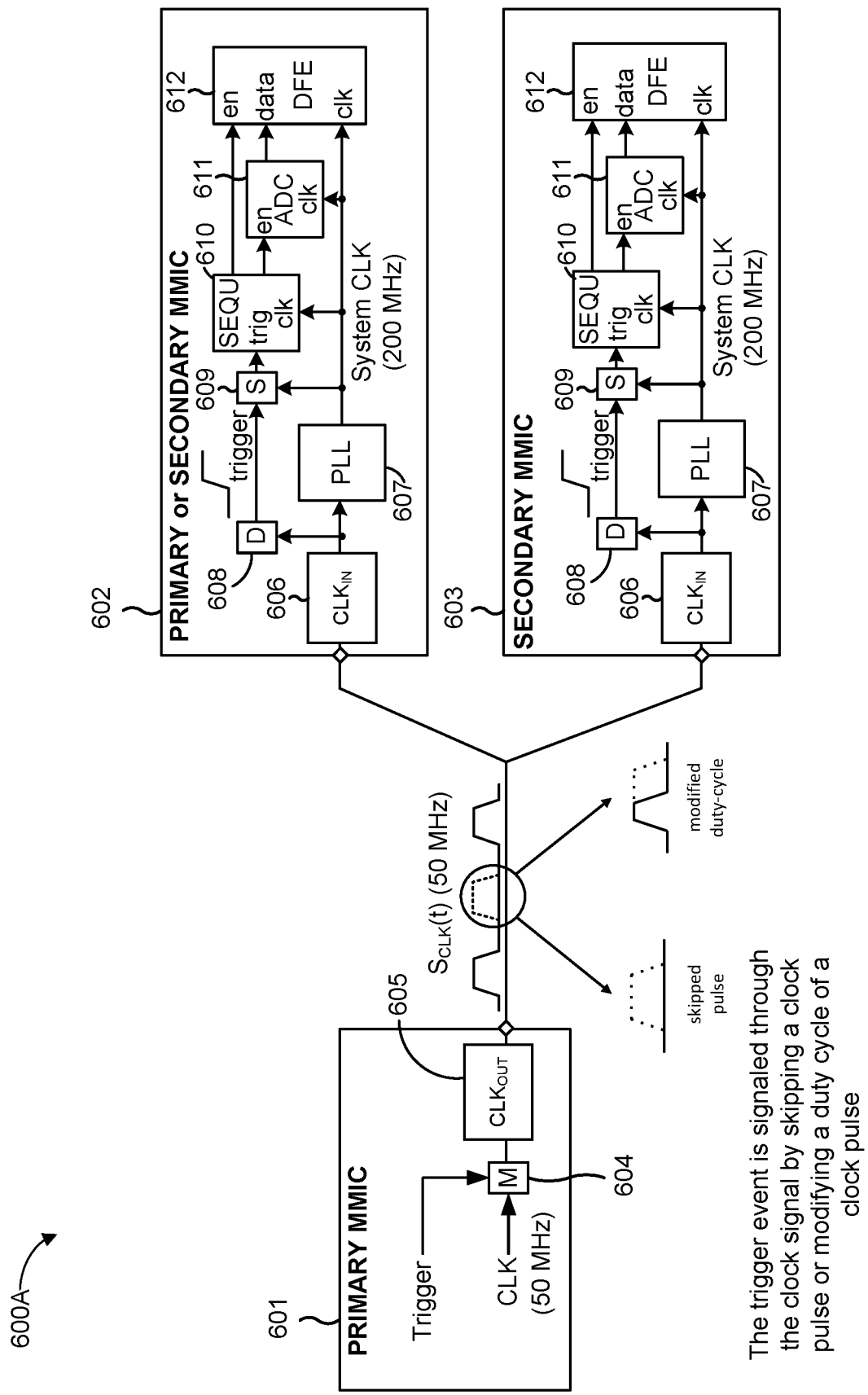
FIG. 6A shows a cascaded radar system according to one or more implementations.

FIG. 6A shows a cascaded radar system 600A according to one or more implementations. The cascaded radar system 600A may be similar to the cascaded radar system 500 described in connection with FIG. 5. The cascaded radar system 600A may include a plurality of MMICs 601-603. The MMIC 601 may be a primary MMIC (e.g., primary MMIC 501). The MMIC 602 may be the primary MMIC that receives signals from itself (e.g., to match a transmission delay of signals transmitted from the primary MMIC to other MMICs). Alternatively, the MMIC 602 may be a secondary MMIC (e.g., secondary MMIC 502, 503, or 504) that may perform radar operations in synchronization with radar operations performed by the primary MMIC based on trigger events signaled by the MMIC 601. The MMIC 603 may be a secondary MMIC (e.g., secondary MMIC 502, 503, or 504) that may perform radar operations in synchronization with radar operations performed by the primary MMIC based on trigger events signaled by the MMIC 601. In some implementations, additional secondary MMICs may be provided (see, e.g., FIG. 5). In this example, the MMIC 602 and the MMIC 603 have a same or similar configuration. Accordingly, a description of the MMIC 602 corresponds to a description of the MMIC 603, and vice versa.

The MMIC 601 includes a trigger encoder 604 and a clock output 605 (CLKout). The trigger encoder 604 may receive a clock signal CLK (e.g., a 50 MHz clock signal) comprising a plurality of clock pulses having a fixed amplitude and a trigger signal configured to indicate trigger events. The clock signal CLK may be generated by a clock source (not illustrated) that is integrated in the MMIC 601 or that is located external to the MMIC 601. The clock signal CLK may be an active-high clock signal or an active-low clock signal. Similarly, the trigger signal may be generated by a signal generator (not illustrated) that is integrated in the MMIC 601 or that is located external to the MMIC 601. The trigger encoder 604 may encode the trigger signal into the clock signal CLK to generate a distributed clock signal $S_{CLK}(t)$ by skipping at least one clock pulse of the plurality of clock pulses to indicate a trigger event. The frequencies of the clock signal CLK and the distributed clock signal $S_{CLK}(t)$ are equal. The clock output 605 may output the distributed clock signal $S_{CLK}(t)$ having the at least one clock pulse skipped to indicate the trigger event. In some implementations, the trigger encoder 604 comprises a clock gate controlled by the trigger signal.

Alternatively, in some implementations, the clock signal CLK comprises a plurality of clock pulses having a fixed duty cycle. In this case, the trigger encoder may encode the trigger signal into the clock signal CLK to generate the distributed clock signal $S_{CLK}(f)$ by modifying a duty cycle of at least one clock pulse of the plurality of clock pulses to generate at least one encoded clock pulse that indicates a trigger event. The duty cycle of the at least one encoded clock pulse is different from the fixed duty cycle. In addition, the clock output 605 may output the distributed clock signal $S_{CLK}(t)$ having the at least one encoded clock pulse to indicate the trigger event.

The MMIC 602 has a clock input 606 (CLKin) that may receive the distributed clock signal $S_{CLK}(t)$ from the MMIC 601. The MMIC 602 may derive a system clock signal from the distributed clock signal $S_{CLK}(t)$. For example, the MMIC 602 may include a phase-locked loop (PLL) 607 that generates the system clock signal from the distributed clock signal $S_{CLK}(A)$. The PLL 607 may be configured to scale a frequency of the distributed clock signal $S_{CLK}(t)$ and clean-up (e.g., filter) the distributed clock signal $S_{CLK}(t)$ for generating the system clock signal. For example, a frequency of the system clock signal may be a multiple of the frequency of the distributed clock signal $S_{CLK}(t)$. For example, the frequency of the distributed clock signal $S_{CLK}(t)$ may be 50 MHz and the frequency of the system clock signal may be 200 MHz. In some implementations, the PLL 607 may not perform scaling (e.g., a scaling is a factor of one) and may only perform a clean-up in order to remove (e.g., filter) unwanted signal components that may be present in the distributed clock signal $S_{CLK}(t)$. In this case, the frequency of the clock signal CLK, the frequency of the distributed clock signal $S_{CLK}(t)$, and the frequency of the system clock signal may be equal or substantially equal (e.g., 200 MHz). In some implementations, the PLL 607 may be absent and the MMIC 602 may use the distributed clock signal $S_{CLK}(t)$ as the system clock signal (e.g., after some digital filtering).

The MMIC 602 includes a trigger decoder 608 that may receive the distributed clock signal $S_{CLK}(t)$ from the clock input 606 and detect an absence of the at least one clock pulse in the distributed clock signal and generate the trigger signal comprising a trigger pulse that indicates the trigger event in response to detecting the absence of the at least one clock pulse in the distributed clock signal $S_{CLK}(t)$. In other words, the trigger decoder 608 reproduces the trigger signal that is encoded into the distributed clock signal $S_{CLK}(t)$. Alternatively, the trigger decoder 608 may detect the at least one encoded clock pulse in the distributed clock signal $S_{CLK}(t)$ and generate the trigger signal comprising a trigger pulse that indicates the trigger event in response to detecting the at least one encoded clock pulse in the distributed clock signal $S_{CLK}(t)$.

The MMIC 602 may include a synchronizer 609 that synchronizes the trigger signal with the system clock signal to generate a synchronized trigger signal that includes the trigger pulse. In some implementations, the synchronizer 609 may not be present. Thus, the synchronizer 609 may be optional.

The MMIC 602 may include a radar operation controller 610 (e.g., a control circuit) configured to receive the trigger signal or the synchronized trigger signal and initiate a radar operation based on (e.g., triggered by) detecting the trigger pulse in the trigger signal or the synchronized trigger signal. The radar operation controller 610 may include a sequencer SEQU that is configured to initiate the radar operation. In some implementations, the radar operation corresponds to a single radar frame comprising a sequence of frequency ramps, and the radar operation controller 610 is configured to initiate the radar frame based on detecting the trigger pulse by starting a transmission of the sequence of frequency ramps. For example, the radar operation controller 610 may transmit enable signals to an ADC 611 and digital components of a DFE 612 of the MMIC 602. The enable signal may enable (e.g., activate) the ADC 611 and the digital components to start respective operations, which may be performed using the system clock signal. For example, once enabled, the ADC 611 may start sampling data based on the system clock signal and provide the sampled data to the DFE 612 for digital processing. Once enabled, the DFE 612 may process the sampled data based on the system clock signal. After the radar frame has lapsed, the radar operation controller 610 may disable (e.g., deactivate) the ADC 611 and the DFE 612 to end the radar operation. The radar operation controller 610 may wait for a next trigger pulse signaled by the trigger signal from the trigger decoder 608 to initiate another radar operation.

Since both the trigger signal and the clock signal are distributed together over a same distribution network, there is no mismatch between the trigger signal and the clock signal. In addition, timings of the radar operations performed by the MMICs 601-603 are synchronized by the trigger signal that is encoded in the distributed clock signal $S_{CLK}(t)$.

As indicated above, FIG. 6A is provided merely as an example. Other examples may differ from what is described with regard to FIG. 6A. The number and arrangement of components shown in FIG. 6A are provided as an example. In practice, the cascaded radar system 600A may include additional components, fewer components, different components, or differently arranged components than those shown in FIG. 6A. Two or more components shown in FIG. 6A may be implemented within a single component, or a single component shown in FIG. 6A may be implemented as multiple, distributed components. Additionally, or alternatively, a set of components (e.g., one or more components) of the cascaded radar system 600A may perform one or more functions described as being performed by another set of components of the cascaded radar system 600A.

Figure 6B:
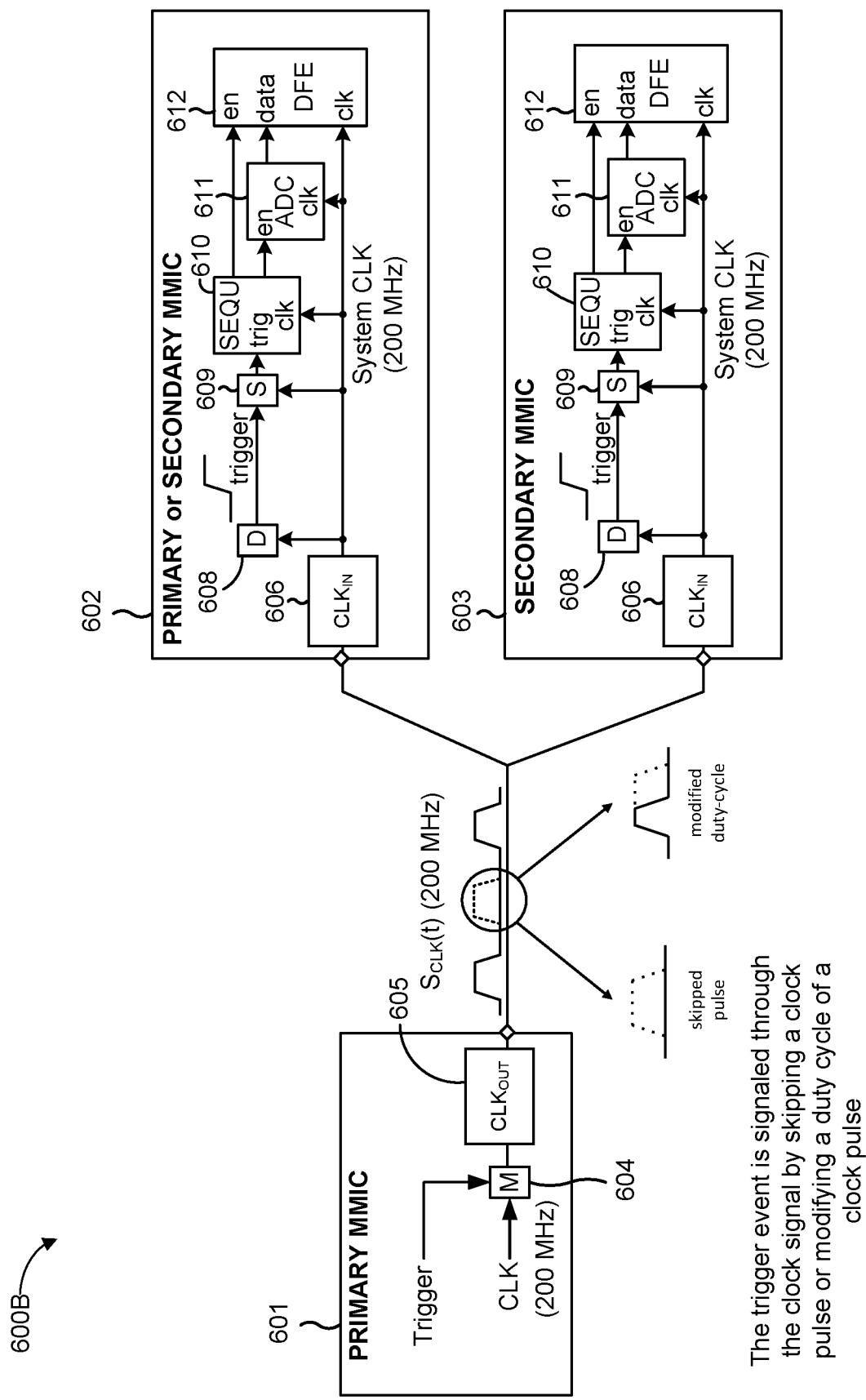
FIG. 6B shows a cascaded radar system according to one or more implementations.

FIG. 6B shows a cascaded radar system 600B according to one or more implementations. The cascaded radar system 600B is similar to the cascaded radar system 600A, with the exception that the PLL 607 is not included. In this case, the MMIC 602 may use the distributed clock signal $S_{CLK}(t)$ as the system clock signal (e.g., after some digital filtering). Thus, the frequency of the clock signal CLK, the frequency of the distributed clock signal $S_{CLK}(t)$, and the frequency of the system clock signal may be equal or substantially equal (e.g., 200 MHZ). Accordingly, the skipped pulses or encoded pulses are present in the system clock signal, which does not affect radar operations, but the trigger decoder 608, the synchronizer 609, the radar operation controller 610, the ADC 611, the DFE 612, and the other digital blocks (not illustrated in FIG. 6) may be designed to tolerate or compensate for the skipped pulses or the encoded pulses in background digital operations depending on clock cycle counting.

As indicated above, FIG. 6B is provided as an example. Other examples may differ from what is described with regard to FIG. 6B.

Figure 7:
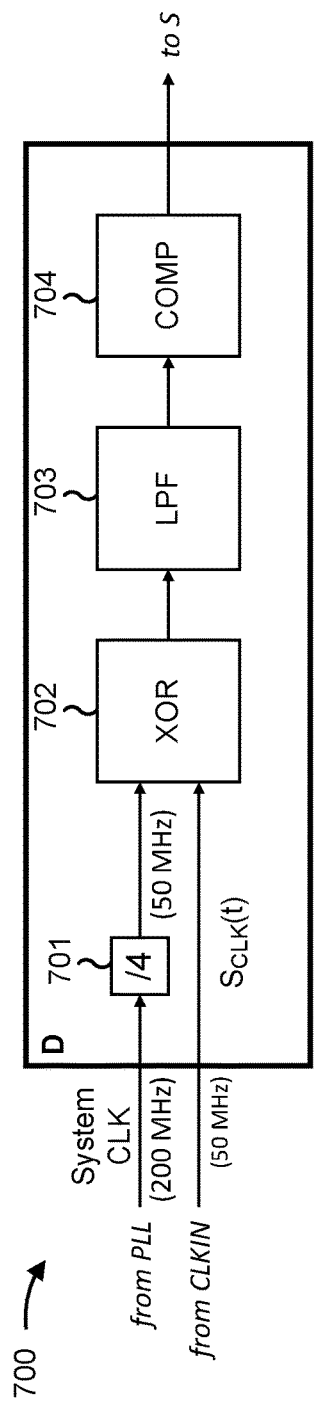
FIG. 7 shows a schematic block diagram of a trigger decoder according to one or more implementations.

FIG. 7 shows a schematic block diagram of a trigger decoder 700 according to one or more implementations. The trigger decoder 700 may correspond to the trigger decoder 608 described in connection with FIGS. 6A and 6B. The trigger decoder 700 may include an optional frequency divider 701, an XOR gate 702, a low-pass filter (LPF) 703, and a comparator (COMP) 704. The frequency divider 701 may divide a frequency of the system clock signal to generate a reduced frequency clock signal having a reduced frequency that is equal to a frequency of the distributed clock signal $S_{CLK}(t)$. In other words, the frequency divider 701 may be provided when the system clock signal generated by the PLL 60 has a higher frequency than the frequency of the distributed clock signal $S_{CLK}(t)$. Alternatively, when the frequencies of the system clock signal and the distributed clock signal $S_{CLK}(t)$ are the same, the scaling factor of the frequency divider 701 may be set to one. Alternatively, when the frequencies of the system clock signal and the distributed clock signal $S_{CLK}(t)$ are the same, the frequency divider 701 may be absent. Thus, the frequencies of the two signals received by the XOR gate 702 are the same.

The XOR gate 702 may be coupled to an output of the frequency divider 701 and configured to combine the distributed clock signal and the output of the frequency divider 701 to generate an XOR output signal. Alternatively, in the case that the frequency divider 701 is not provided, the XOR gate 702 may receive the system clock signal and the distributed clock signal $S_{CLK}(t)$, and may combine the distributed clock signal $S_{CLK}(t)$ and the system clock signal to generate the XOR output signal. For example, the XOR gate 702 may generate the XOR output signal having no pulse(s) or a sequence of first pulses (e.g., narrow pulses), while clock pulses are present in the distributed clock signal $S_{CLK}(t)$ received by the XOR gate 702. Additionally, the XOR output signal may have at least one second pulse (e.g., wide pulse), while the at least one clock pulse is absent from the distributed clock signal $S_{CLK}(t)$ received by the XOR gate 702. A first time duration of each first pulse of the sequence of first pulses is shorter than a second time duration of each second pulse of the at least one second pulse.

The low-pass filter 703 may be coupled to an output of the XOR gate and configured to low-pass filter the XOR output signal to generate a filtered XOR output signal. The comparator 704 may be coupled to an output of the low-pass filter 703 and configured to compare the filtered XOR output signal to a threshold, and generate the trigger signal based on the filtered XOR output signal satisfying the threshold. For example, the comparator 704 may generate the trigger pulse based on a rising edge of the filtered XOR output signal crossing the threshold.

As indicated above, FIG. 7 is provided as an example. Other examples may differ from what is described with regard to FIG. 7.

Figure 8:
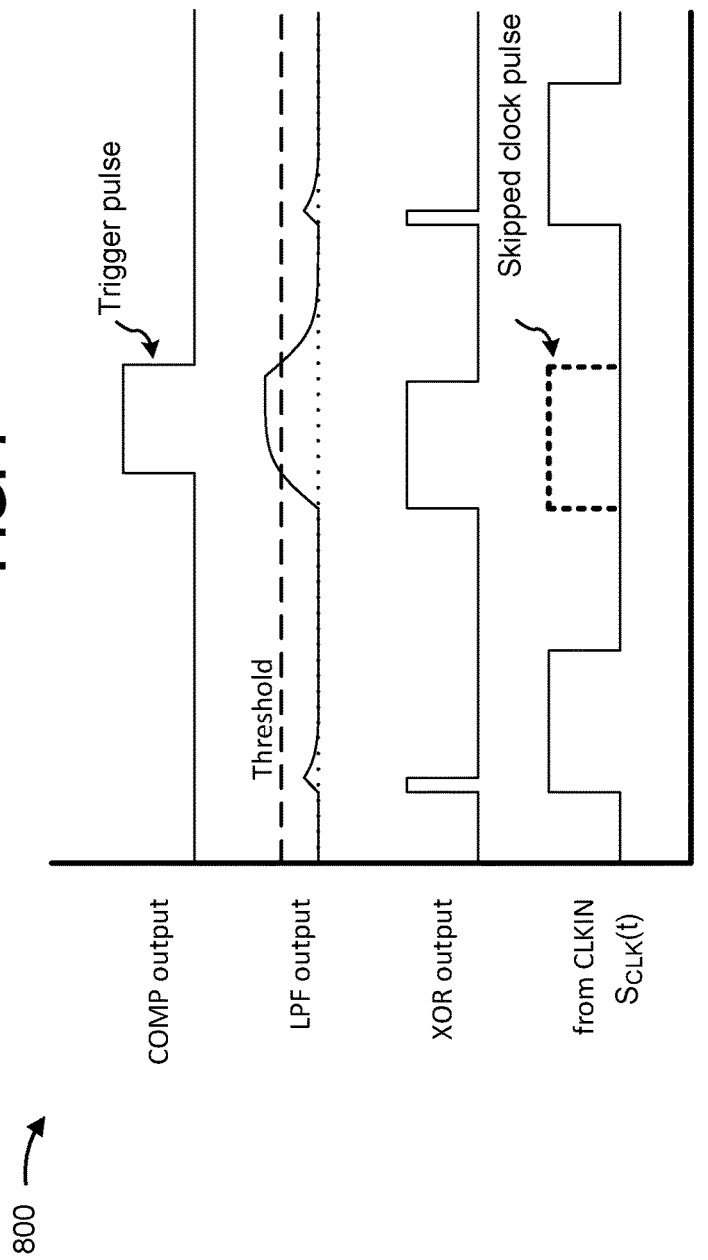
FIG. 8 is a waveform diagram of various signals corresponding to the trigger decoder described in connection with FIG. 7.

FIG. 8 is a waveform diagram 800 of various signals corresponding to the trigger decoder 700 described in connection with FIG. 7. The waveform diagram 800 includes the distributed clock signal $S_{CLK}(t)$ from the clock input CLKin, the XOR output signal (e.g., XOR output) output from the XOR gate 702, the filtered XOR output signal (e.g., LPF output) output from the low-pass filter 703, and the trigger signal (e.g., COMP output) output from the comparator 704. The XOR gate 702 combines (e.g., compares using an exclusive or logic operation) the distributed clock signal $S_{CLK}(t)$ with the input from the system clock signal. When a clock pulse is present in the distributed clock signal $S_{CLK}(t)$, the XOR gate 702 may generate no pulse (e.g., when the clock pulse is synchronized with a pulse of the other input) or may generate a narrow pulse, as shown, when there is a small offset or delay between the clock pulse of the distributed clock signal $S_{CLK}(t)$ and a pulse of the other input. For example, the frequency divider 701 may introduce a small delay on the reduced-frequency clock signal such that a small offset exists between the clock pulse of the distributed clock signal $S_{CLK}(t)$ and a pulse of the reduced-frequency clock signal. When a clock pulse is absent in the distributed clock signal $S_{CLK}(t)$, due to the clock pulse having been skipped by the trigger encoder 604, the XOR gate 702 may generate a long or wide pulse that indicates that the clock pulse is missing from the distributed clock signal $S_{CLK}(t)$. Thus, the wide pulse indicates that a trigger event is present.

When the low-pass filter 703 receives a narrow pulse in the XOR output signal, the filtered XOR output signal (e.g., LPF output) may have a slight increase. However, the slight increase remains below the threshold of the comparator 704. Similarly, when the low-pass filter 703 does not receive a pulse in the XOR output signal, the filtered XOR output signal remains at a low signal level, below the threshold of the comparator 704. On the other hand, when the low-pass filter 703 receives a wide pulse in the XOR output signal, the filtered XOR output signal has a large increase that crosses the threshold of the comparator 704. The filtered XOR output signal eventually falls again, below the threshold of the comparator 704. As a result, the comparator 704 generates a pulse when the filtered XOR output signal is equal to or exceeds the threshold of the comparator 704. In other words, the comparator 704 generates the trigger signal and the pulse is the trigger pulse.

As indicated above, FIG. 8 is provided as an example. Other examples may differ from what is described with regard to FIG. 8.

FIG. 9 shows a schematic block diagram of a trigger decoder 900 according to one or more implementations. The trigger decoder 900 may correspond to the trigger decoder 608 described in connection with FIGS. 6A and 6B. The trigger decoder 900 may include a counter (CNT) 901 and a comparator (COMP) 902. The trigger decoder 900 may receive the system clock signal and the distributed clock signal $S_{CLK}(t)$. The system clock signal has a higher frequency than a frequency of the distributed clock signal $S_{CLK}(t)$. Therefore, the counter 901 may receive the distributed clock signal $S_{CLK}(t)$ and the system clock signal, sample the distributed clock signal $S_{CLK}(t)$ based on clock transition edges of the system clock signal (e.g., a sampling of the distributed clock signal $S_{CLK}(t)$ is triggered by a clock transition edge of the system clock signal), increment a counter value (e.g., CNT output) when a pulse is absent from the distributed clock signal $S_{CLK}(t)$, and reset the counter value (e.g., CNT output) when a pulse is present in the distributed clock signal $S_{CLK}(t)$. The clock transition edges of the system clock signal that are used to trigger the sampling of the distributed clock signal $S_{CLK}(t)$ may be falling transition edges, rising transition edges, or falling transition edges and rising transition edges, and the counter 901 is configured to sample the distributed clock signal $S_{CLK}(t)$ for presence of a pulse for each clock transition edge of the system clock signal.

The comparator 902 may compare the counter value (e.g., CNT output) to a threshold and generate the trigger signal based on the counter value satisfying the threshold (e.g., when the counter value is equal to or greater than the threshold). When clock pulses in the distributed clock signal $S_{CLK}(t)$ are received on a regular basis, the counter value should reset before satisfying the threshold. However, when one or more clock pulses are skipped in the distributed clock signal $S_{CLK}(t)$, the counter value increases to a value that satisfies the threshold.

As indicated above, FIG. 9 is provided as an example. Other examples may differ from what is described with regard to FIG. 9.

FIG. 10 is a waveform diagram 1000 of various signals corresponding to the trigger decoder 900 described in connection with FIG. 9. The waveform diagram 1000 includes the distributed clock signal $S_{CLK}(t)$ from the clock input CLKin, the system clock signal from the PLL 607, the counter value (e.g., CNT output) output from the counter 901, and the trigger signal (e.g., COMP output) output from the comparator 902. In this example, falling transition edges of the system clock signal are used to trigger a sampling of the distributed clock signal $S_{CLK}(t)$. The counter value (e.g., CNT output) is reset when a clock pulse is present in the distributed clock signal $S_{CLK}(t)$, and increases to a value that satisfies the threshold of the comparator 902 when one or more clock pulses are skipped in the distributed clock signal $S_{CLK}(t)$. Thus, the comparator 902 generates a pulse when the counter value is equal to or exceeds the threshold of the comparator 902. In other words, the comparator 902 generates the trigger signal and the pulse is the trigger pulse.

As indicated above, FIG. 10 is provided as an example. Other examples may differ from what is described with regard to FIG. 10.

Figure 11:
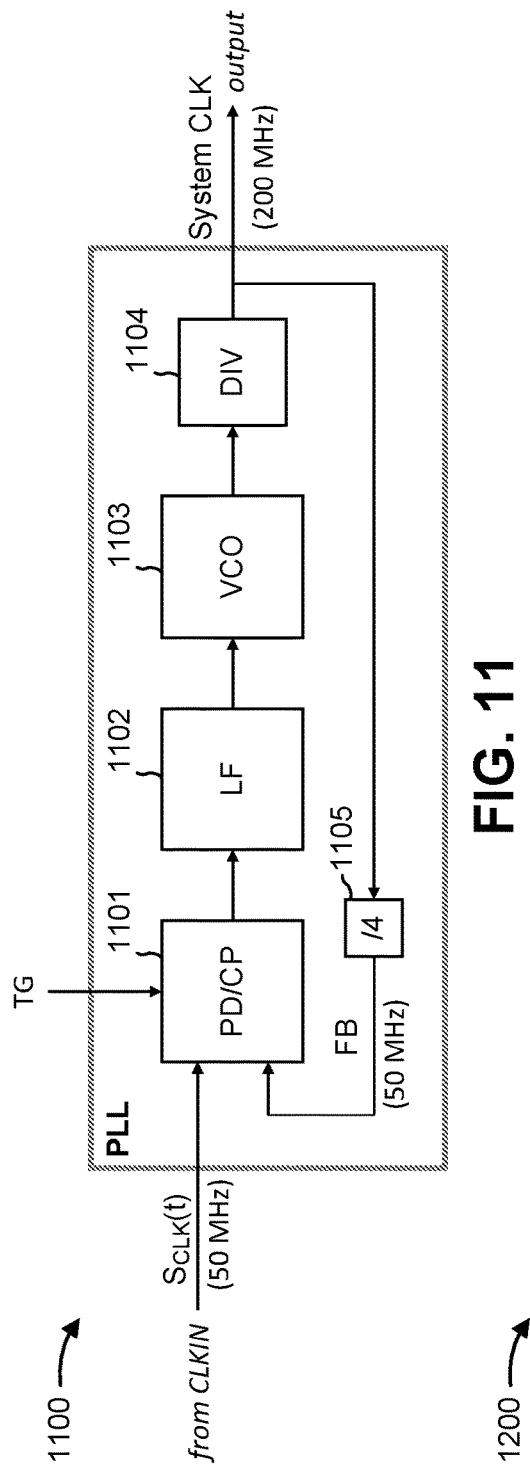
FIG. 11 shows a schematic block diagram of a phase-locked loop (PLL) according to one or more implementations.

FIG. 11 shows a schematic block diagram of a PLL 1100 according to one or more implementations. The PLL 1100 may correspond to the PLL 607 described in connection with FIGS. 6A and 6B. The PLL 1100 may receive the distributed clock signal $S_{CLK}(t)$ and generate the system clock signal based on the distributed clock signal $S_{CLK}(t)$. For example, the PLL 1100 may restore the at least one clock pulse skipped in the distributed clock signal $S_{CLK}(t)$ and generate the system clock signal having the at least one clock pulse, as restored. The frequency of the system clock signal may be equal to or greater than the frequency of the distributed clock signal $S_{CLK}(t)$, as described in connection with FIGS. 6A and 6B.

The PLL 1100 may include a phase detector and charge-pump circuit 1101 that includes a phase detector and a charge-pump, a loop filter 1102, an oscillator 1103, an optional first frequency divider 1104, and an optional second frequency divider 1105. The phase detector and charge-pump circuit 1101 may receive the distributed clock signal $S_{CLK}(t)$ and a feedback signal FB, and generate a phase error signal based on a phase difference between the distributed clock signal $S_{CLK}(t)$ and the feedback signal FB. The loop filter 1102 may generate a control signal based on the phase error signal for controlling a frequency of the oscillator 1103. Thus, the oscillator 1103 may generate an oscillator signal based on the control signal, where the system clock signal corresponds to the oscillator signal. In some implementations, the oscillator 1103 is a voltage-controlled oscillator (VCO). Depending on a steady state frequency of the oscillator, the first frequency divider 1104 may be provided to generate the system clock signal with a desired frequency. Moreover, depending on the desired frequency of the system clock signal, the second frequency divider 1105 may be provided to generate the feedback signal FB having the same frequency as the frequency of the distributed clock signal $S_{CLK}(t)$.

In some implementations, the phase detector and charge-pump circuit 1101 is further configured to receive a trigger gating signal TG that is configured to disable the phase detector and charge-pump circuit 1101 at a time at which the trigger event is signaled by the distributed clock signal $S_{CLK}(t)$. The impact of the trigger event (e.g., the skipped pulse) on the system clock signal can be reduced by using the trigger gating signal TG to disable the phase detector and charge-pump circuit 1101 at a time at which the trigger event is signaled by the distributed clock signal $S_{CLK}(t)$ and received by the PLL 1100. The disabling of the phase detector and charge-pump circuit 1101 may create a frequency disturbance in the system clock signal (e.g., due to a mismatch and leakage currents in the phase detector and charge-pump circuit 1101), but with a much smaller frequency deviation and faster settling time in comparison to a case when the phase detector and charge-pump circuit 1101 is not disabled when the trigger event is received by the PLL 1100.

As indicated above, FIG. 11 is provided as an example. Other examples may differ from what is described with regard to FIG. 11.

Figure 12:
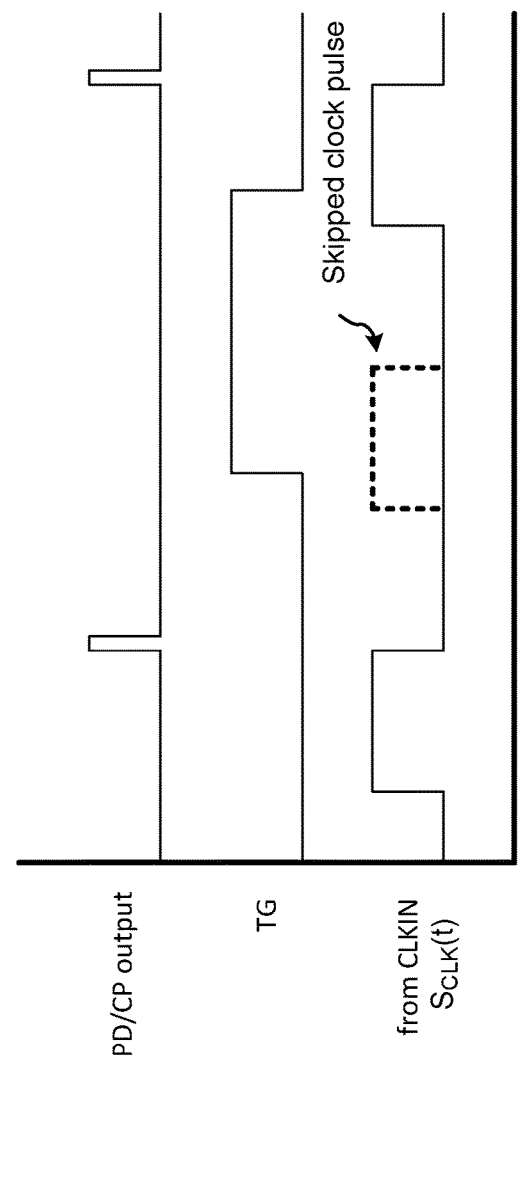
FIG. 12 is a waveform diagram of various signals corresponding to the PLL described in connection with FIG. 11.

FIG. 12 is a waveform diagram 1200 of various signals corresponding to the PLL 1100 described in connection with FIG. 11. The waveform diagram 1200 includes the distributed clock signal $S_{CLK}(t)$ from the clock input CLKin, an output of the phase detector and charge-pump circuit 1101, and the trigger gating signal TG. The control circuit of an MMIC may generate the trigger gating signal TG locally and provide the trigger gating signal TG to its PLL 1100. For example, the control circuit may detect a first missing edge of distributed clock signal $S_{CLK}(t)$ and disable the phase detector and charge-pump circuit 1101 at a second missing edge of the distributed clock signal $S_{CLK}(t)$, where the first missing edge and the second missing edge correspond to a skipped clock pulse of the distributed clock signal $S_{CLK}(t)$. The phase detector and charge-pump circuit 1101 of the PLL 1100 may be disabled for one or more reference clock cycles at the moment the missing falling edge in the distributed clock signal $S_{CLK}(t)$ is detected by the control circuit.

As indicated above, FIG. 12 is provided as an example. Other examples may differ from what is described with regard to FIG. 12.

Figure 13:
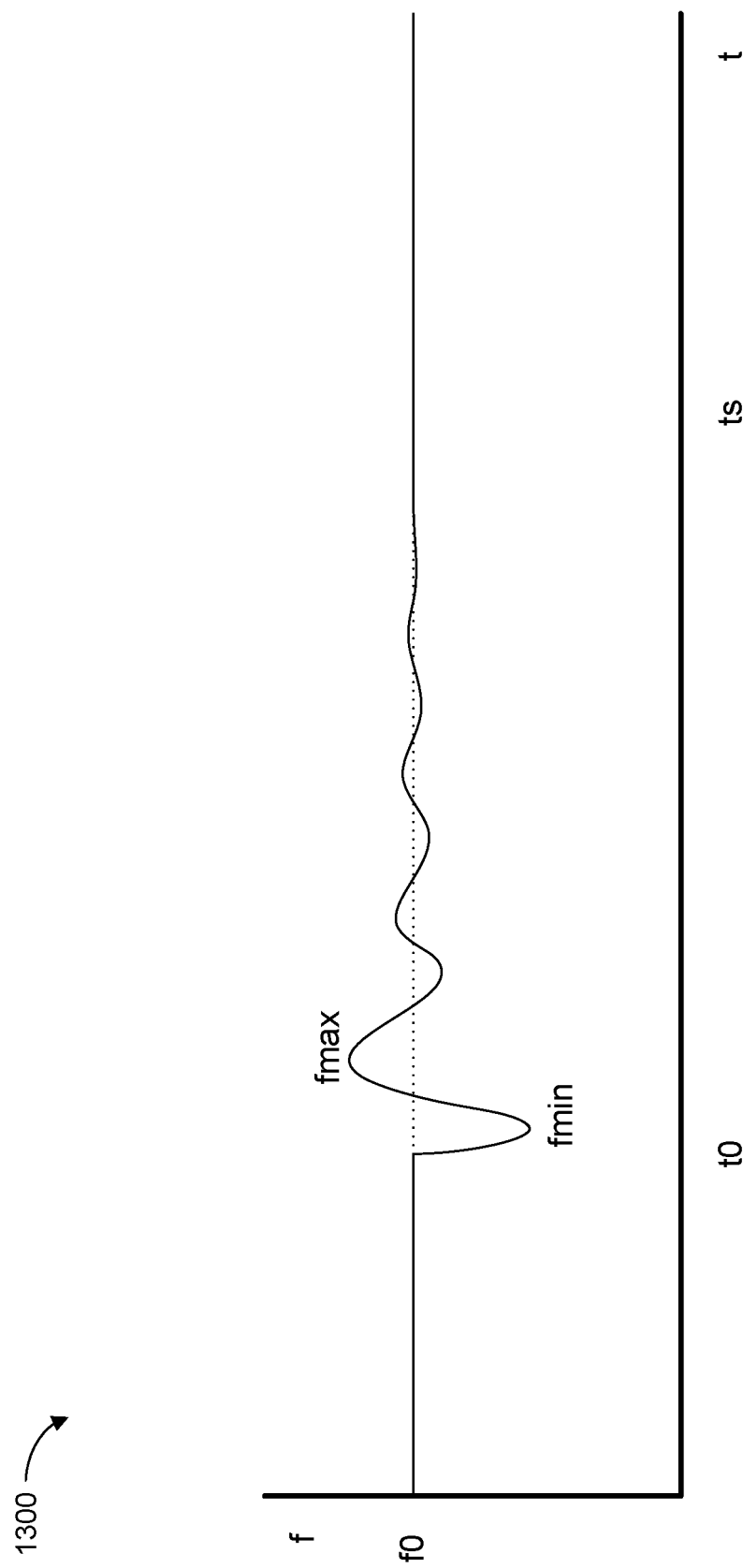
FIG. 13 is a frequency diagram of a PLL output according to one or more implementations.

FIG. 13 is a frequency diagram 1300 of a PLL output according to one or more implementations. The frequency f of the PLL output (e.g., the system clock) is temporarily distorted from its steady-state value f0 when the trigger event (e.g., a skipped clock pulse) appears in the distributed clock signal $S_{CLK}(t)$ at time t0. The frequency f of the PLL output is first reduced to a minimum value fmin (e.g., the PLL detects that the feedback clock FB is faster than the distributed clock signal $S_{CLK}(t)$ used as a reference signal, which is missing at least once clock pulse, and slows-down the oscillator 1103). Then, depending on loop dynamics of the PLL, the frequency f of the PLL output is increased to a maximum value fmax. After reaching the maximum value fmax, the frequency/of the PLL output gradually converges again to the steady-state value f0 at time ts. In some implementations, a frequency deviation between the steady-state value f0 and the minimum value fmin and a frequency deviation between the steady-state value f0) and the maximum value fmax is no more than 1% of the steady-state value f0. After time ts, the frequency deviations are below the noise level and do not affect the components using the system clock signal. In some implementations, a settling time (e.g., a time duration between t0 and ts) is at the order of 500 reference clock cycles. During the settling time, there is no radar activity, and the frequency deviation is small enough for background digital activity to operate effectively.

In some implementations, a signaling scheme may be used in which two or more clock pulses are removed from the clock signal CLK in order to signal the presence of a trigger event. This may provide more time to the trigger decoder 608 in order to detect the presence of the trigger event, at a cost of a bigger disturbance in the PLL 607.

As indicated above, FIG. 13 is provided as an example. Other examples may differ from what is described with regard to FIG. 13.

Figure 14:
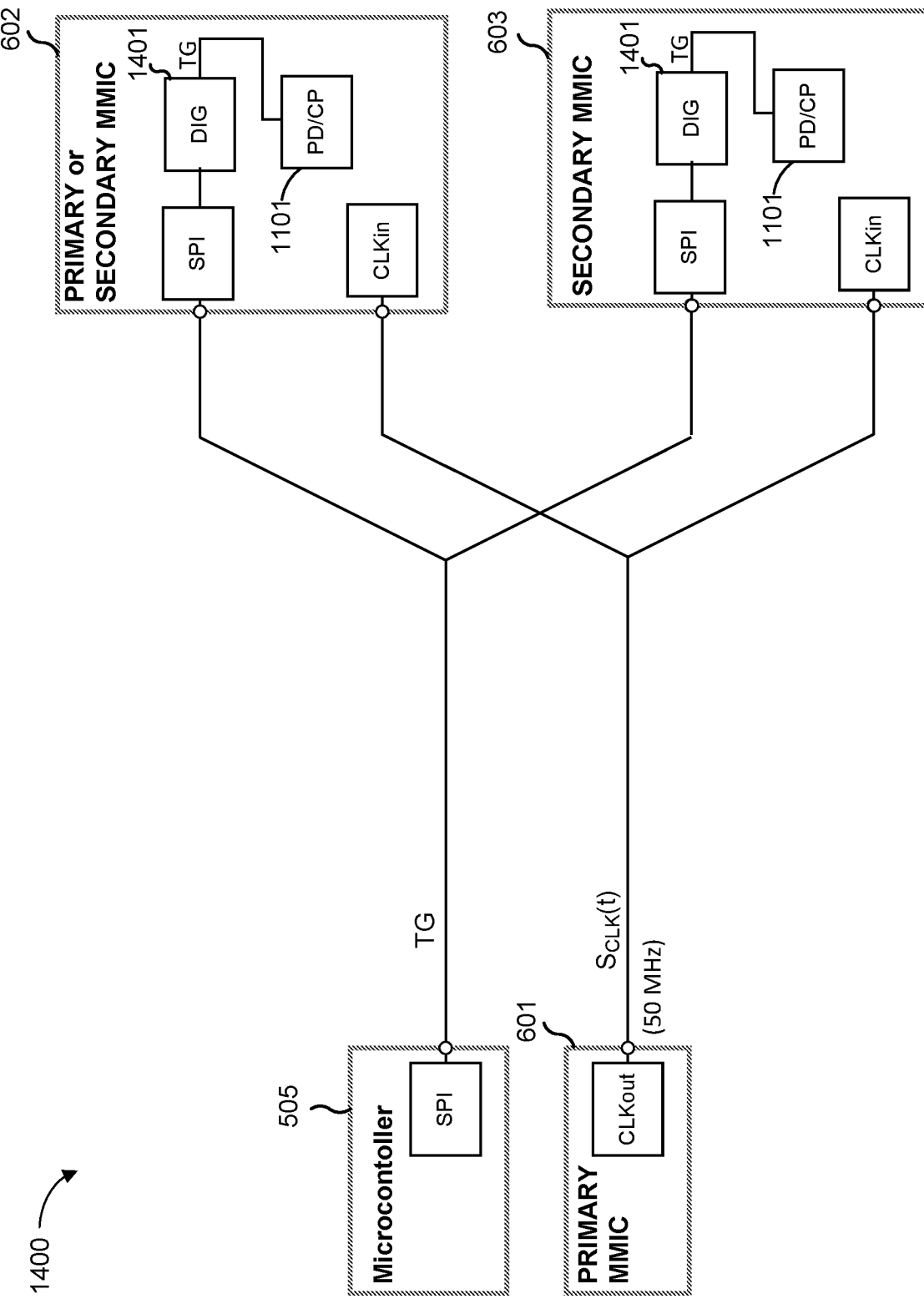
FIG. 14 shows a cascaded radar system according to one or more implementations.

FIG. 14 shows a cascaded radar system 1400 according to one or more implementations. The cascaded radar system 1400 may be similar to the cascaded radar system 500, the cascaded radar system 600A, or the cascaded radar system 600B. Thus, the cascaded radar system 1400 may include the microcontroller 505 (e.g., a system controller) and MMICs 601-603. The microcontroller 505 may generate a trigger gating signal TG and transmit the trigger gating signal TG to the MMICs 601-603 prior to the trigger event indicated by the distributed clock signal $S_{CLK}(t)$. In some implementations, the microcontroller 505 may transmit the trigger gating signal TG using a serial peripheral interface (SPI). The MMICs 601-603 may each receive the trigger gating signal TG and disable a respective phase detector and charge-pump circuit 1101 after a predetermined time has elapsed after receiving the trigger gating signal TG from the microcontroller 505. For example, each MMIC 601-603 may include a digital circuit 1401 that provides the trigger gating signal TG to the respective phase detector and charge-pump circuit 1101 after a predetermined time has elapsed after receiving the trigger gating signal TG from the microcontroller 505. Thus, the trigger gating signal TG may be provided to each respective phase detector and charge-pump circuit 1101 with relaxed timing precision.

As indicated above, FIG. 14 is provided as an example. Other examples may differ from what is described with regard to FIG. 14.

FIG. 15 shows a schematic block diagram of a state machine system 1500 according to one or more implementations. Each MMIC (e.g., MMICs 601-603) may include the state machine system 1500 for locally generating a trigger gating signal TG for disabling a respective phase detector and charge-pump circuit (e.g., a phase detector and charge-pump circuit 1101). The state machine system 1500 may include a state machine and an optional frequency divider 1502 that is configured to ensure that the inputs of the state machine 1501 have the same frequency. The state machine may receive the trigger signal from the trigger decoder and the system clock signal, or a representation thereof, from the PLL. The state machine 1501 is configured to switch to trigger gating state TG for a first predetermined number of clock cycles each time a second predetermined number of clock cycles has lapsed, such that the trigger gating signal TG is enabled during the trigger gating state. As a result, the phase detector and charge-pump circuit 1101 is disabled during the trigger gating state. The primary MMIC 601 may be configured to signal the trigger event by the distributed clock signal $S_{CLK}(t)$ while the state machine 1501 is in the trigger gating state. As a result, the impact of the trigger event (e.g., the skipped pulse) on the system clock signal can be reduced by using the trigger gating signal TG to disable the phase detector and charge-pump circuit 1101 at a time the trigger event is signaled by the distributed clock signal $S_{CLK}(t)$ and received by the PLL 1100.

As indicated above, FIG. 15 is provided as an example. Other examples may differ from what is described with regard to FIG. 15.

Figure 16B:
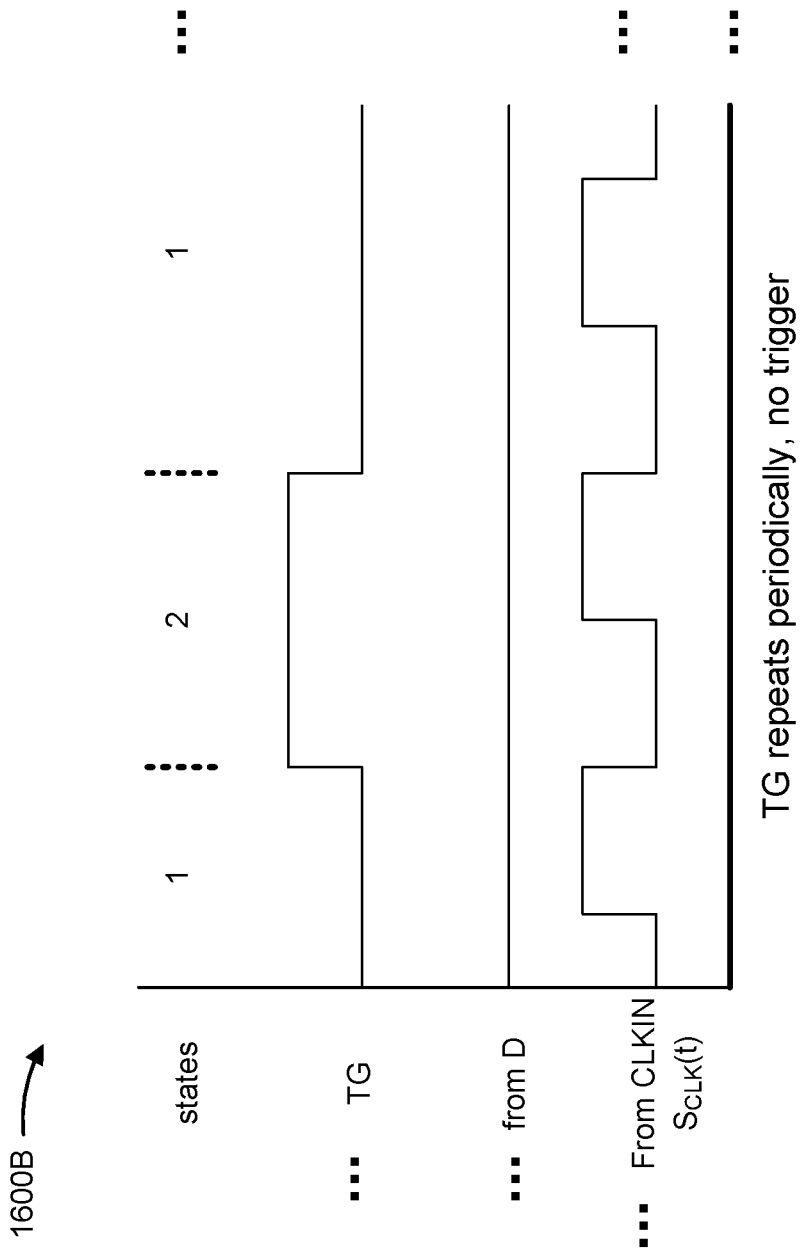
Figure 16C:
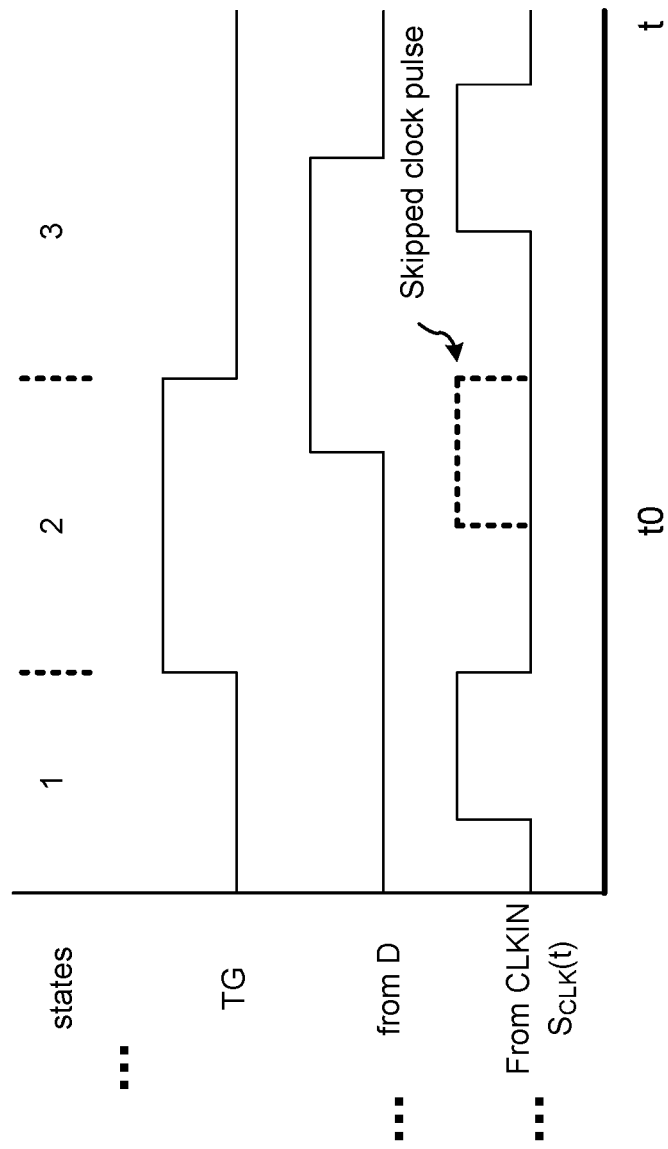

FIGS. 16A-16C show a waveform diagram 1600 of various signals corresponding to the state machine system 1500 described in connection with FIG. 15. FIGS. 16A-16C each show a different segment of the waveform diagram 1600, with a first segment 1600A shown in FIG. 16A, a second segment 1600B shown in FIG. 16B, and a third segment 1600C shown in FIG. 16C.

A periodic trigger gating signal TG is generated locally at each MMIC. Each MMIC employs the state machine 1501, which starts at state 0 and switches to state 1 after a first synchronization at startup. The state machine 1501, after a configurable number of clock cycles, switches periodically to state 2 for one clock cycle, during which the trigger gating signal TG is enabled. The primary MMIC distributes the trigger event by pulse skipping only when the trigger gating signal TG is present. Therefore, the system clock signal is disturbed periodically by a very small amount, until the trigger event (skipped pulse) is distributed, after which the state machine 1501 switches to state 3 and the trigger gating signal TG is disabled in all MMICs, until the radar operation is finished and the state machine 1501 switches back to state 1.

As indicated above, FIGS. 16A-16C are provided as examples. Other examples may differ from what is described with regard to FIGS. 16A-16C.

The following provides an overview of some Aspects of the present disclosure:

Aspect 1: A cascaded radar monolithic microwave integrated circuit (MMIC) system, comprising: a first radar MMIC comprising a trigger encoder configured to receive a clock signal comprising a plurality of clock pulses having a fixed amplitude and a trigger signal configured to indicate trigger events, wherein the trigger encoder is configured to encode the trigger signal into the clock signal to generate a distributed clock signal by skipping at least one clock pulse of the plurality of clock pulses to indicate a trigger event, wherein the first radar MMIC is configured to output the distributed clock signal having the at least one clock pulse skipped to indicate the trigger event; a second radar MMIC configured to receive the distributed clock signal and derive a system clock signal from the distributed clock signal, wherein the second radar MMIC comprises: a trigger decoder configured to detect an absence of the at least one clock pulse in the distributed clock signal and generate the trigger signal comprising a trigger pulse that indicates a trigger event in response to detecting the absence of the at least one clock pulse in the distributed clock signal; and a radar operation controller configured to receive the trigger signal and initiate a radar operation based on detecting the trigger pulse.

Aspect 2: The cascaded radar MMIC system of Aspect 1, wherein the second radar MMIC comprises a synchronizer configured to synchronize the trigger signal with the system clock signal to generate a synchronized trigger signal that includes the trigger pulse, and wherein the radar operation controller configured to receive the synchronized trigger signal and initiate the radar operation based on detecting the trigger pulse in the synchronized trigger signal.

Aspect 3: The cascaded radar MMIC system of any of Aspects 1-2, wherein the radar operation corresponds to a single radar frame comprising a sequence of frequency ramps, and wherein the radar operation controller is configured to initiate the radar frame based on detecting the trigger pulse by starting a transmission of the sequence of frequency ramps.

Aspect 4: The cascaded radar MMIC system of any of Aspects 1-3, wherein the trigger encoder comprises a clock gate controlled by the trigger signal.

Aspect 5: The cascaded radar MMIC system of any of Aspects 1-4, wherein the trigger decoder comprises: a frequency divider configured to divide a frequency of the system clock signal to generate a reduced-frequency clock signal having a reduced frequency that is equal to a frequency of the distributed clock signal; an XOR gate coupled to an output of the frequency divider and configured to combine the distributed clock signal and the reduced-frequency clock signal to generate an XOR output signal; a low-pass filter coupled to an output of the XOR gate and configured to low-pass filter the XOR output signal to generate a filtered XOR output signal; and a comparator coupled to an output of the low-pass filter and configured to compare the filtered XOR output signal to a threshold and generate the trigger signal based on the filtered XOR output signal satisfying the threshold.

Aspect 6: The cascaded radar MMIC system of Aspect 5, wherein the XOR gate is configured to generate the XOR output signal having: no pulse or a sequence of first pulses while clock pulses are present in the distributed clock signal received by the XOR gate, and at least one second pulse while the at least one clock pulse is absent from the distributed clock signal received by the XOR gate, wherein a first time duration of each first pulse of the sequence of first pulses is shorter than a second time duration of each second pulse of the at least one second pulse.

Aspect 7: The cascaded radar MMIC system of any of Aspects 1-6, wherein the trigger decoder comprises: an XOR gate configured to combine the distributed clock signal and the system clock signal to generate an XOR output signal; a low-pass filter coupled to an output of the XOR gate and configured to low-pass filter the XOR output signal to generate a filtered XOR output signal; and a comparator coupled to an output of the low-pass filter and configured to compare the filtered XOR output signal to a threshold and generate the trigger signal based on the filtered XOR output signal satisfying the threshold.

Aspect 8: The cascaded radar MMIC system of any of Aspects 1-7, wherein the system clock signal has a higher frequency than a frequency of the distributed clock signal, wherein the trigger decoder comprises: a counter configured to receive the distributed clock signal and the system clock signal, sample the distributed clock signal based on clock transition edges of the system clock signal, increment a counter value each instance a pulse is absent from the distributed clock signal, and reset the counter value each instance a pulse is detected in the distributed clock signal; and a comparator configured to compare the counter value to a threshold and generate the trigger signal based on the counter value satisfying the threshold.

Aspect 9: The cascaded radar MMIC system of Aspect 8, wherein the clock transition edges of the system clock signal are falling transition edges, rising transition edges, or falling transition edges and rising transition edges, and wherein the counter is configured to sample the distributed clock signal for presence of a pulse for each clock transition edge of the system clock signal.

Aspect 10: The cascaded radar MMIC system of any of Aspects 1-9, wherein the second radar MMIC comprises a phase-locked loop (PLL) configured to receive the distributed clock signal and generate the system clock signal based on the distributed clock signal.

Aspect 11: The cascaded radar MMIC system of Aspect 10, wherein the PLL is configured to restore the at least one clock pulse skipped in the distributed clock signal and generate the system clock signal having the at least one clock pulse, as restored.

Aspect 12: The cascaded radar MMIC system of Aspect 10, wherein a frequency of the system clock signal is equal to or greater than a frequency of the distributed clock signal.

Aspect 13: The cascaded radar MMIC system of Aspect 10, wherein the PLL comprises: a phase detector and charge-pump circuit configured to receive the distributed clock signal and a feedback signal, and generate an error signal based on the distributed clock signal and the feedback signal; a loop filter configured to generate a control signal based on the error signal; and an oscillator configured to generate an oscillator signal based on the control signal, wherein the system clock signal corresponds to the oscillator signal, wherein the phase detector and charge-pump circuit is further configured to receive a trigger gating signal that is configured to disable the phase detector and charge-pump circuit at a time the trigger event is signaled by the distributed clock signal.

Aspect 14: The cascaded radar MMIC system of Aspect 13, wherein the second radar MMIC is configured to detect a first missing edge of distributed clock signal and disable the phase detector and charge-pump circuit at a second missing edge of the distributed clock signal, where the first missing edge and the second missing edge correspond to a skipped clock pulse of the distributed clock signal.

Aspect 15: The cascaded radar MMIC system of Aspect 13, further comprising: a system controller configured to generate the trigger gating signal and transmit the trigger gating signal to the second radar MMIC prior to the trigger event indicated by the distributed clock signal, wherein the second radar MMIC is configured to disable the phase detector and charge-pump circuit after a predetermined time has elapsed after receiving the trigger gating signal from the system controller.

Aspect 16: The cascaded radar MMIC system of Aspect 13, wherein the second radar MMIC comprises a state machine configured to switch to trigger gating state for a first predetermined number of clock cycles each time a second predetermined number of clock cycles has lapsed, wherein the trigger gating signal is enabled during the trigger gating state such that the phase detector and charge-pump circuit is disabled during the trigger gating state, and wherein the first radar MMIC is configured to signal the trigger event by the distributed clock signal while the state machine is in the trigger gating state.

Aspect 17: The cascaded radar MMIC system of any of Aspects 1-16, wherein the first radar MMIC is configured to output and receive the distributed clock signal, wherein the first radar MMIC comprises: a further trigger decoder configured to detect the absence of the at least one clock pulse in the distributed clock signal and generate a further trigger signal comprising a further trigger pulse that indicates the trigger event in response to detecting the absence of the at least one clock pulse in the distributed clock signal, wherein the further trigger pulse is synchronized with the trigger pulse of the second radar MMIC; and a further radar operation controller configured to receive the further trigger signal and initiate a further radar operation based on detecting the trigger pulse, wherein the further radar operation is synchronized with the radar operation of the second radar MMIC.

Aspect 18: A cascaded radar monolithic microwave integrated circuit (MMIC) system, comprising: a first radar MMIC comprising a trigger encoder configured to receive a clock signal comprising a plurality of clock pulses having a fixed duty cycle and a trigger signal configured to indicate trigger events, wherein the trigger encoder is configured to encode the trigger signal into the clock signal to generate a distributed clock signal by modifying a duty cycle of at least one clock pulse of the plurality of clock pulses to generate at least one encoded clock pulse that indicates a trigger event, wherein the duty cycle of the at least one encoded clock pulse is different from the fixed duty cycle, wherein the first radar MMIC is configured to output the distributed clock signal having the at least one encoded clock pulse to indicate the trigger event; a second radar MMIC configured to receive the distributed clock signal and derive a system clock signal from the distributed clock signal, wherein the second radar MMIC comprises: a trigger decoder configured to detect the at least one encoded clock pulse in the distributed clock signal and generate the trigger signal comprising a trigger pulse that indicates the trigger event in response to detecting the at least one encoded clock pulse in the distributed clock signal; and a radar operation controller configured to receive the trigger signal and initiate a radar operation based on detecting the trigger pulse.

Aspect 19: A method of synchronizing a cascaded radar monolithic microwave integrated circuit (MMIC) system, the method comprising: encoding, by a first radar MMIC, a trigger signal into a clock signal comprising a plurality of clock pulses having a fixed amplitude to generate a distributed clock signal by skipping at least one clock pulse of the plurality of clock pulses to indicate a trigger event, wherein the trigger signal is configured to indicate trigger events; outputting, by the first radar MMIC, the distributed clock signal having the at least one clock pulse skipped to indicate the trigger event; receiving, by a second radar MMIC, the distributed clock signal; deriving, by the second radar MMIC, a system clock signal from the distributed clock signal; demodulating, by the second radar MMIC, the distributed clock signal to detect an absence of the at least one clock pulse in the distributed clock signal; generating, by the second radar MMIC, the trigger signal comprising a trigger pulse that indicates the trigger event in response to detecting the absence of the at least one clock pulse in the distributed clock signal; and initiating, by the second radar MMIC, a radar operation based on detecting the trigger pulse in the trigger signal.

Aspect 20: A radar monolithic microwave integrated circuit (MMIC), comprising: a local oscillator configured to generate a local oscillator signal; a trigger encoder configured to receive a clock signal comprising a plurality of clock pulses having a fixed amplitude and a trigger signal configured to indicate trigger events; wherein the trigger encoder is configured to encode the trigger signal into the clock signal to generate a distributed clock signal by skipping at least one clock pulse of the plurality of clock pulses to indicate a trigger event, wherein the radar MMIC is configured to output the distributed clock signal having the at least one clock pulse skipped to indicate the trigger event, wherein the radar MMIC is configured to receive the distributed clock signal as a received distributed clock signal, and wherein the radar MMIC is configured to output the local oscillator signal; and a radar operation controller configured to detect the trigger event based on the received distributed clock signal and initiate a radar operation based on detecting the trigger event.

Aspect 21: A radar monolithic microwave integrated circuit (MMIC), comprising: at least one of a transmit channel for transmitting radio frequency (RF) signals or a receive channel for receiving RF echoes; a clock input circuit configured to receive a distributed clock signal and derive a system clock signal from the distributed clock signal, wherein the distributed clock signal is a clock signal comprising a plurality of clock pulses having a fixed amplitude that is encoded with a trigger signal configured to indicate trigger events, wherein at least one clock pulse of the plurality of clock pulses are skipped in the distributed clock signal to indicate a trigger event; a trigger decoder configured to detect an absence of the at least one clock pulse in the distributed clock signal and generate the trigger signal comprising a trigger pulse that indicates the trigger event in response to detecting the absence of the at least one clock pulse in the distributed clock signal; and a radar operation controller configured to receive the trigger signal and initiate a radar operation based on detecting the trigger pulse.

Aspect 22: A system configured to perform one or more operations recited in one or more of Aspects 1-21.

Aspect 23: An apparatus comprising means for performing one or more operations recited in one or more of Aspects 1-21.

Aspect 24: A non-transitory computer-readable medium storing a set of instructions, the set of instructions comprising one or more instructions that, when executed by a device, cause the device to perform one or more operations recited in one or more of Aspects 1-21.

Aspect 25: A computer program product comprising instructions or code for executing one or more operations recited in one or more of Aspects 1-21.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software. It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Any of the processing components may be implemented as a central processing unit (CPU) or other processor reading and executing a software program from a non-transitory computer-readable recording medium such as a hard disk or a semiconductor memory device. For example, instructions may be executed by one or more processors, such as one or more CPUs, DSPs, general-purpose microprocessors, application-specific integrated circuits (ASICs), field programmable logic arrays (FPLAs), programmable logic controller (PLC), or other equivalent integrated or discrete logic circuitry. Accordingly, the term "processor," as used herein refers to any of the foregoing structures or any other structure suitable for implementation of the techniques described herein. Software may be stored on a non-transitory computer-readable medium such that the non-transitory computer readable medium includes a program code or a program algorithm stored thereon which, when executed, causes the processor, via a computer program, to perform the steps of a method.

A controller including hardware may also perform one or more of the techniques of this disclosure. A controller, including one or more processors, may use electrical signals and digital algorithms to perform its receptive, analytic, and control functions, which may further include corrective functions. Such hardware, software, and firmware may be implemented within the same device or within separate devices to support the various techniques described in this disclosure.

A signal processing circuit and/or a signal conditioning circuit may receive one or more signals (e.g., measurement signals) from one or more components in the form of raw measurement data and may derive, from the measurement signal further information. Signal conditioning, as used herein, refers to manipulating an analog signal in such a way that the signal meets the requirements of a next stage for further processing. Signal conditioning may include converting from analog to digital (e.g., via an analog-to-digital converter), amplification, filtering, converting, biasing, range matching, isolation and any other processes required to make a signal suitable for processing after conditioning.

Some implementations may be described herein in connection with thresholds. As used herein, satisfying a threshold may refer to a value being greater than the threshold, more than the threshold, higher than the threshold, greater than or equal to the threshold, less than the threshold, fewer than the threshold, lower than the threshold, less than or equal to the threshold, equal to the threshold, or the like.

Even though particular combinations of features are recited in the claims and/or disclosed in the specification, these combinations are not intended to limit the disclosure of implementations described herein. Many of these features may be combined in ways not specifically recited in the claims and/or disclosed in the specification. For example, the disclosure includes each dependent claim in a claim set in combination with every other individual claim in that claim set and every combination of multiple claims in that claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

Further, it is to be understood that the disclosure of multiple acts or functions disclosed in the specification or in the claims may not be construed as to be within the specific order. Therefore, the disclosure of multiple acts or functions will not limit these to a particular order unless such acts or functions are not interchangeable for technical reasons. Furthermore, in some implementations, a single act may include or may be broken into multiple sub acts. Such sub acts may be included and part of the disclosure of this single act unless explicitly excluded.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Where only one item is intended, the phrase "only one," "single," or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. As used herein, the term "multiple" can be replaced with "a plurality of" and vice versa. Also, as used herein, the term "or" is intended to be inclusive when used in a series and may be used interchangeably with "and/or," unless explicitly stated otherwise (e.g., if used in combination with "either" or "only one of").

What is claimed is:

1. A cascaded radar monolithic microwave integrated circuit (MMIC) system, comprising:
   a first radar MMIC comprising a trigger encoder configured to receive a clock signal comprising a plurality of clock pulses having a fixed amplitude and a trigger signal configured to indicate trigger events,
      wherein the trigger encoder is configured to encode the trigger signal into the clock signal to generate a distributed clock signal by skipping at least one clock pulse of the plurality of clock pulses to indicate a trigger event,
      wherein the first radar MMIC is configured to output the distributed clock signal having the at least one clock pulse skipped to indicate the trigger event;
   a second radar MMIC configured to receive the distributed clock signal and derive a system clock signal from the distributed clock signal, wherein the second radar MMIC comprises:
      a trigger decoder configured to detect an absence of the at least one clock pulse in the distributed clock signal and generate the trigger signal comprising a trigger pulse that indicates the trigger event in response to detecting the absence of the at least one clock pulse in the distributed clock signal; and
      a radar operation controller configured to receive the trigger signal and initiate a radar operation based on detecting the trigger pulse.

2. The cascaded radar MMIC system of claim 1, wherein the second radar MMIC comprises a synchronizer configured to synchronize the trigger signal with the system clock signal to generate a synchronized trigger signal that includes the trigger pulse, and
   wherein the radar operation controller is configured to receive the synchronized trigger signal and initiate the radar operation based on detecting the trigger pulse in the synchronized trigger signal.

3. The cascaded radar MMIC system of claim 1, wherein the radar operation corresponds to a single radar frame comprising a sequence of frequency ramps, and
   wherein the radar operation controller is configured to initiate the single radar frame based on detecting the trigger pulse by starting a transmission of the sequence of frequency ramps.

4. The cascaded radar MMIC system of claim 1, wherein the trigger encoder comprises a clock gate controlled by the trigger signal.

5. The cascaded radar MMIC system of claim 1, wherein the trigger decoder comprises:
   a frequency divider configured to divide a frequency of the system clock signal to generate a reduced-frequency clock signal having a reduced frequency that is equal to a frequency of the distributed clock signal;
   an XOR gate coupled to an output of the frequency divider and configured to combine the distributed clock signal and the reduced-frequency clock signal to generate an XOR output signal;
   a low-pass filter coupled to an output of the XOR gate and configured to low-pass filter the XOR output signal to generate a filtered XOR output signal; and
   a comparator coupled to an output of the low-pass filter and configured to compare the filtered XOR output signal to a threshold and generate the trigger signal based on the filtered XOR output signal satisfying the threshold.

6. The cascaded radar MMIC system of claim 5, wherein the XOR gate is configured to generate the XOR output signal having:
   no pulse or a sequence of first pulses while clock pulses are present in the distributed clock signal received by the XOR gate, and
   at least one second pulse while the at least one clock pulse is absent from the distributed clock signal received by the XOR gate, wherein a first time duration of each first pulse of the sequence of first pulses is shorter than a second time duration of each second pulse of the at least one second pulse.

7. The cascaded radar MMIC system of claim 1, wherein the trigger decoder comprises:
   an XOR gate configured to combine the distributed clock signal and the system clock signal to generate an XOR output signal;
   a low-pass filter coupled to an output of the XOR gate and configured to low-pass filter the XOR output signal to generate a filtered XOR output signal; and
   a comparator coupled to an output of the low-pass filter and configured to compare the filtered XOR output signal to a threshold and generate the trigger signal based on the filtered XOR output signal satisfying the threshold.

8. The cascaded radar MMIC system of claim 1, wherein the system clock signal has a higher frequency than a frequency of the distributed clock signal,
   wherein the trigger decoder comprises:
   a counter configured to receive the distributed clock signal and the system clock signal, sample the distributed clock signal based on clock transition edges of the system clock signal, increment a counter value each instance a pulse is absent from the distributed clock signal, and reset the counter value each instance a pulse is detected in the distributed clock signal; and
   a comparator configured to compare the counter value to a threshold and generate the trigger signal based on the counter value satisfying the threshold.

9. The cascaded radar MMIC system of claim 8, wherein the clock transition edges of the system clock signal are falling transition edges, rising transition edges, or falling transition edges and rising transition edges, and
  wherein the counter is configured to sample the distributed clock signal for presence of a pulse for each clock transition edge of the system clock signal.

10. The cascaded radar MMIC system of claim 1, wherein the second radar MMIC comprises a phase-locked loop (PLL) configured to receive the distributed clock signal and generate the system clock signal based on the distributed clock signal.

11. The cascaded radar MMIC system of claim 10, wherein the PLL is configured to restore the at least one clock pulse skipped in the distributed clock signal and generate the system clock signal having the at least one clock pulse, as restored.

12. The cascaded radar MMIC system of claim 10, wherein a frequency of the system clock signal is equal to or greater than a frequency of the distributed clock signal.

13. The cascaded radar MMIC system of claim 10, wherein the PLL comprises:
  a phase detector and charge-pump circuit configured to receive the distributed clock signal and a feedback signal, and generate an error signal based on the distributed clock signal and the feedback signal;
  a loop filter configured to generate a control signal based on the error signal; and
  an oscillator configured to generate an oscillator signal based on the control signal, wherein the system clock signal corresponds to the oscillator signal,
  wherein the phase detector and charge-pump circuit is further configured to receive a trigger gating signal that is configured to disable the phase detector and charge-pump circuit at a time the trigger event is signaled by the distributed clock signal.

14. The cascaded radar MMIC system of claim 13, wherein the second radar MMIC is configured to detect a first missing edge of the distributed clock signal and disable the phase detector and charge-pump circuit at a second missing edge of the distributed clock signal, where the first missing edge and the second missing edge correspond to a skipped clock pulse of the distributed clock signal.

15. The cascaded radar MMIC system of claim 13, further comprising:
  a system controller configured to generate the trigger gating signal and transmit the trigger gating signal to the second radar MMIC prior to the trigger event indicated by the distributed clock signal,
  wherein the second radar MMIC is configured to disable the phase detector and charge-pump circuit after a predetermined time has elapsed after receiving the trigger gating signal from the system controller.

16. The cascaded radar MMIC system of claim 13, wherein the second radar MMIC comprises a state machine configured to switch to a trigger gating state for a first predetermined number of clock cycles each time a second predetermined number of clock cycles has lapsed, wherein the trigger gating signal is enabled during the trigger gating state such that the phase detector and charge-pump circuit is disabled during the trigger gating state, and
  wherein the first radar MMIC is configured to signal the trigger event by the distributed clock signal while the state machine is in the trigger gating state.

17. The cascaded radar MMIC system of claim 1, wherein the first radar MMIC is configured to output and receive the distributed clock signal, wherein the first radar MMIC comprises:
  a further trigger decoder configured to detect the absence of the at least one clock pulse in the distributed clock signal and generate a further trigger signal comprising a further trigger pulse that indicates the trigger event in response to detecting the absence of the at least one clock pulse in the distributed clock signal, wherein the further trigger pulse is synchronized with the trigger pulse of the second radar MMIC; and
  a further radar operation controller configured to receive the further trigger signal and initiate a further radar operation based on detecting the trigger pulse, wherein the further radar operation is synchronized with the radar operation of the second radar MMIC.

18. A cascaded radar monolithic microwave integrated circuit (MMIC) system, comprising:
  a first radar MMIC comprising a trigger encoder configured to receive a clock signal comprising a plurality of clock pulses having a fixed duty cycle and a trigger signal configured to indicate trigger events,
    wherein the trigger encoder is configured to encode the trigger signal into the clock signal to generate a distributed clock signal by modifying a duty cycle of at least one clock pulse of the plurality of clock pulses to generate at least one encoded clock pulse that indicates a trigger event,
    wherein the duty cycle of the at least one encoded clock pulse is different from the fixed duty cycle, and
    wherein the first radar MMIC is configured to output the distributed clock signal having the at least one encoded clock pulse to indicate the trigger event;
  a second radar MMIC configured to receive the distributed clock signal and derive a system clock signal from the distributed clock signal, wherein the second radar MMIC comprises:
    a trigger decoder configured to detect the at least one encoded clock pulse in the distributed clock signal and generate the trigger signal comprising a trigger pulse that indicates the trigger event in response to detecting the at least one encoded clock pulse in the distributed clock signal; and
    a radar operation controller configured to receive the trigger signal and initiate a radar operation based on detecting the trigger pulse.

19. A method of synchronizing a cascaded radar monolithic microwave integrated circuit (MMIC) system, the method comprising:
  encoding, by a first radar MMIC, a trigger signal into a clock signal comprising a plurality of clock pulses having a fixed amplitude to generate a distributed clock signal by skipping at least one clock pulse of the plurality of clock pulses to indicate a trigger event, wherein the trigger signal is configured to indicate trigger events;
  outputting, by the first radar MMIC, the distributed clock signal having the at least one clock pulse skipped to indicate the trigger event;
  receiving, by a second radar MMIC, the distributed clock signal;
  deriving, by the second radar MMIC, a system clock signal from the distributed clock signal;
  demodulating, by the second radar MMIC, the distributed clock signal to detect an absence of the at least one clock pulse in the distributed clock signal;
  generating, by the second radar MMIC, the trigger signal comprising a trigger pulse that indicates the trigger event in response to detecting the absence of the at least one clock pulse in the distributed clock signal; and initiating, by the second radar MMIC, a radar operation based on detecting the trigger pulse in the trigger signal.

20. A radar monolithic microwave integrated circuit (MMIC), comprising:
- a local oscillator configured to generate a local oscillator signal;
- a trigger encoder configured to receive a clock signal comprising a plurality of clock pulses having a fixed amplitude and a trigger signal configured to indicate trigger events;
  - wherein the trigger encoder is configured to encode the trigger signal into the clock signal to generate a distributed clock signal by skipping at least one clock pulse of the plurality of clock pulses to indicate a trigger event,
  - wherein the radar MMIC is configured to output the distributed clock signal having the at least one clock pulse skipped to indicate the trigger event,
  - wherein the radar MMIC is configured to receive the distributed clock signal as a received distributed clock signal, and
  - wherein the radar MMIC is configured to output the local oscillator signal; and
- a radar operation controller configured to detect the trigger event based on the received distributed clock signal and initiate a radar operation based on detecting the trigger event.

21. A radar monolithic microwave integrated circuit (MMIC), comprising:
- at least one of a transmit channel for transmitting radio frequency (RF) signals or a receive channel for receiving RF echoes;
- a clock input circuit configured to receive a distributed clock signal and derive a system clock signal from the distributed clock signal,
  - wherein the distributed clock signal is a clock signal comprising a plurality of clock pulses having a fixed amplitude that is encoded with a trigger signal configured to indicate trigger events, wherein at least one clock pulse of the plurality of clock pulses is skipped in the distributed clock signal to indicate a trigger event;
- a trigger decoder configured to detect an absence of the at least one clock pulse in the distributed clock signal and generate the trigger signal comprising a trigger pulse that indicates the trigger event in response to detecting the absence of the at least one clock pulse in the distributed clock signal; and
- a radar operation controller configured to receive the trigger signal and initiate a radar operation based on detecting the trigger pulse.

* * * * *